United States Patent
Kanada

(10) Patent No.: US 7,835,764 B2
(45) Date of Patent: Nov. 16, 2010

(54) VIDEO CONFERENCING SYSTEM, CONFERENCE TERMINAL AND IMAGE SERVER

(75) Inventor: Yasusi Kanada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 534 days.

(21) Appl. No.: 11/356,172

(22) Filed: Feb. 17, 2006

(65) Prior Publication Data

US 2006/0206560 A1  Sep. 14, 2006

(30) Foreign Application Priority Data

Mar. 11, 2005 (JP) ............... 2005-068917

(51) Int. Cl.
*H04M 1/00* (2006.01)
*H04N 7/14* (2006.01)

(52) U.S. Cl. .................. 455/550.1; 348/14.8

(58) Field of Classification Search .......... 348/15, 348/14.8, 14.09, 565; 709/204; 455/550.1; 370/260, 261; 715/738, 757, 740; 345/1.1
See application file for complete search history.

(56) References Cited

U.S. PATENT DOCUMENTS

| | | | |
|---|---|---|---|
| 4,400,724 A | 8/1983 | Fields | |
| 6,285,392 B1 * | 9/2001 | Satoda et al. | 348/14.09 |
| 6,327,567 B1 | 12/2001 | Willehadson et al. | |
| 6,330,022 B1 * | 12/2001 | Seligmann | 348/14.08 |
| 2005/0041604 A1 * | 2/2005 | Tighe et al. | 370/263 |
| 2006/0120308 A1 * | 6/2006 | Forbes et al. | 370/260 |

* cited by examiner

*Primary Examiner*—Charles N Appiah
*Assistant Examiner*—Kiet Doan
(74) *Attorney, Agent, or Firm*—Stites & Harbison, PLLC; Juan Carlos A. Marquez, Esq.

(57) ABSTRACT

In a video conferencing system, required bandwidth is suppressed to a lower level and a key person or the like of a conference can be confirmed easily. A presence server 1 manages location information in a virtual space for a user of each conference terminal 2. Each conference terminal 2 sends image data of its own user to another conference terminal 2 in response to a request of that conference terminal 2. Further, each conference terminal 2 receives location information of its own user in the virtual space, sends the received location information to the presence server 1, and receives location information of the other users from the presence server 1. Then, based on the location information of its own user and the location information of the other users, the conference terminal 2 detects forward users located forward from its own user, and receives image data from the conference terminal 2 of each of the forward users.

8 Claims, 19 Drawing Sheets

FIG. 3

LOCATION INFORMATION STORAGE UNIT 104

| USER ID | IMAGE COMMUNICATION SIP-URI | IMAGE COMMUNICATION IP ADDRESS | VOICE COMMUNICATION SIP-URI | VOICE COMMUNICATION IP ADDRESS | VIRTUAL LOCATION INFORMATION (COORDINATES, DIRECTION) |
|---|---|---|---|---|---|
| taro | sip:12345@audio.co.jp | 192.168.0.11 | sip:12345@video.co.jp | 192.168.0.11 | COORDINATES:x1,y1,z1) ORIENTATION:h1 |
| hanako | sip:67890@audio.co.jp | 192.168.0.5 | sip:67890@video.co.jp | 192.168.0.3 | COORDINATES:x2,y2,z2) ORIENTATION:h2 |
| …… | …… | …… | …… | …… | …… |

1041  1042  1043  1044  1045  1046  1040

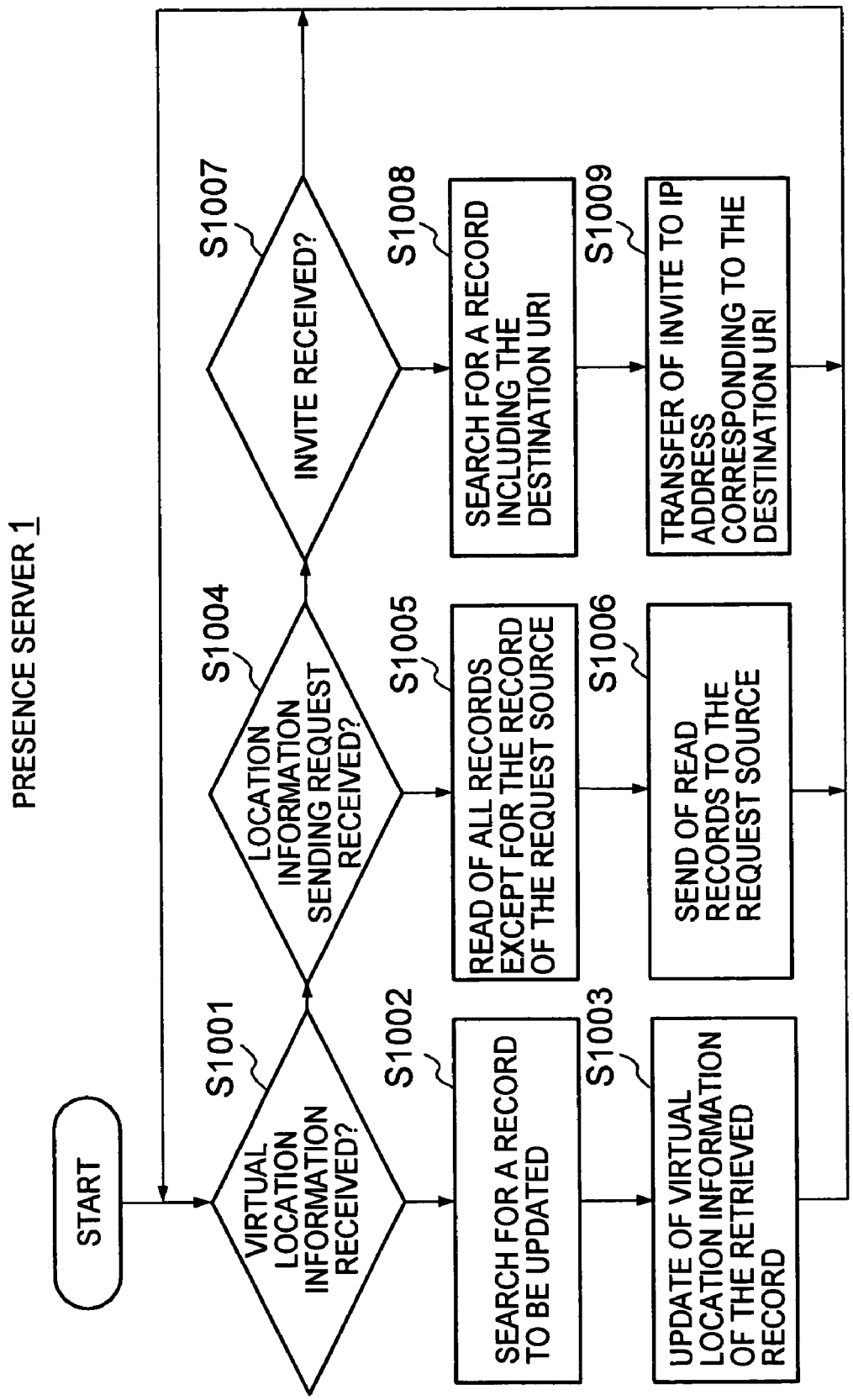

IMAGE SERVER 4

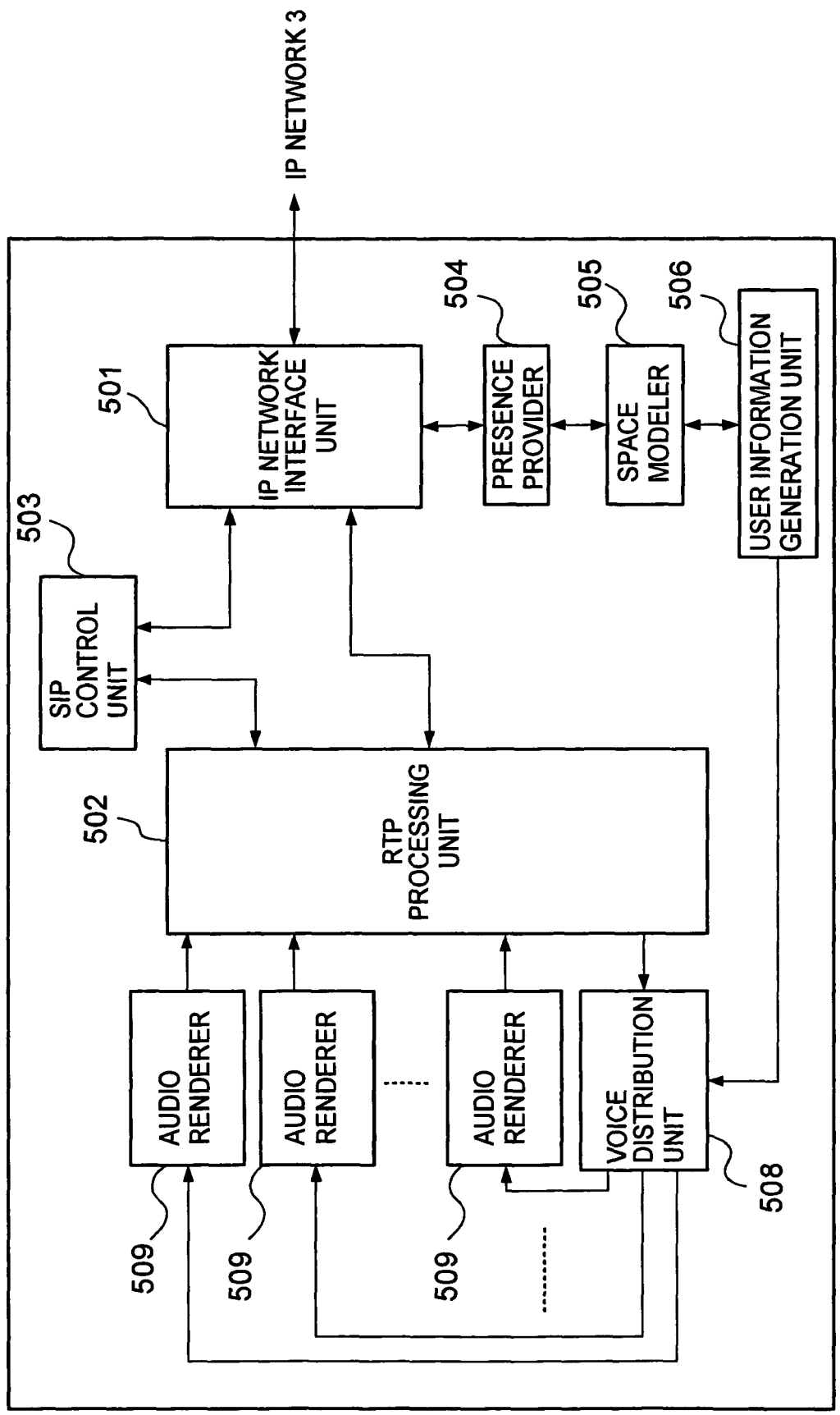

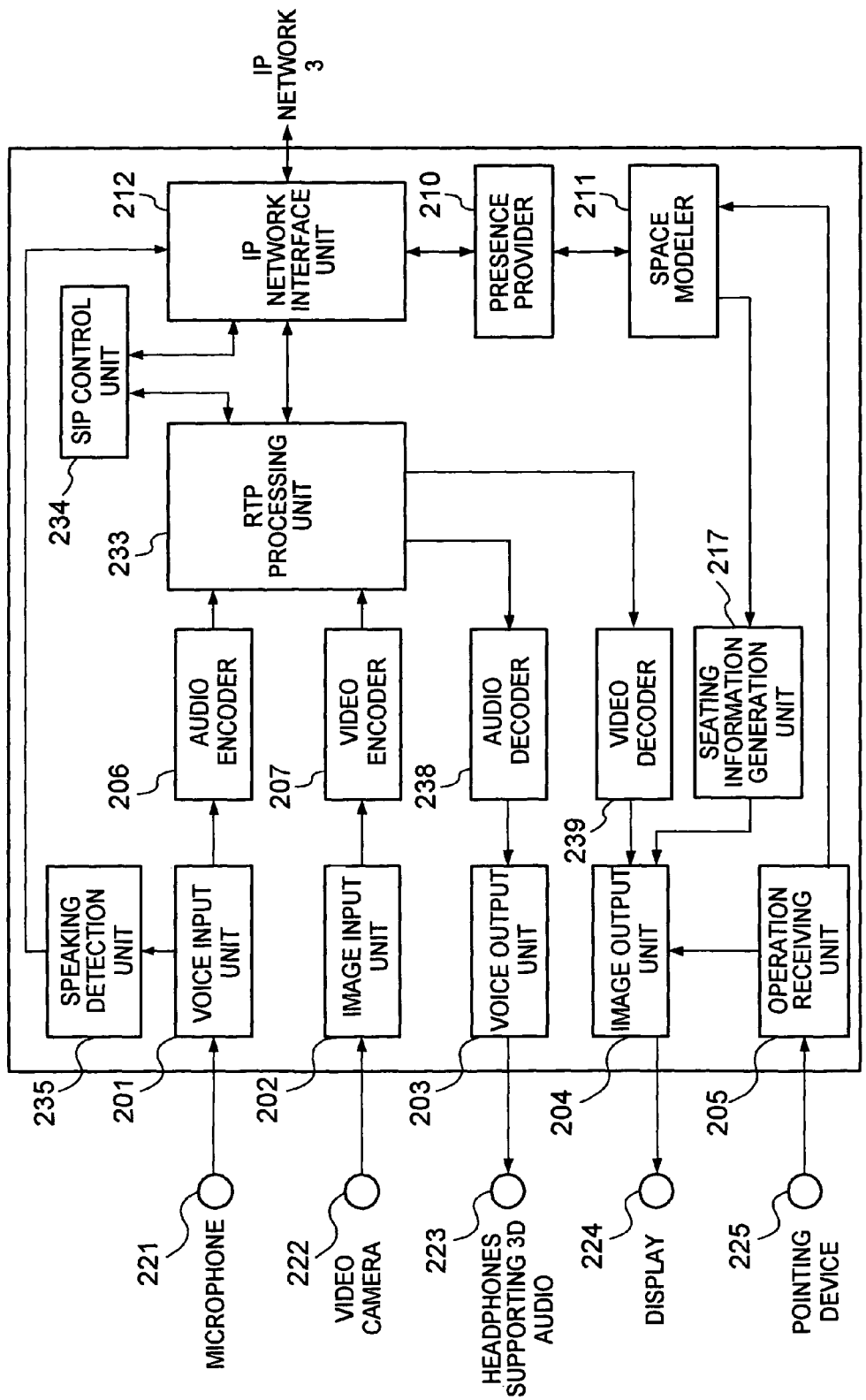

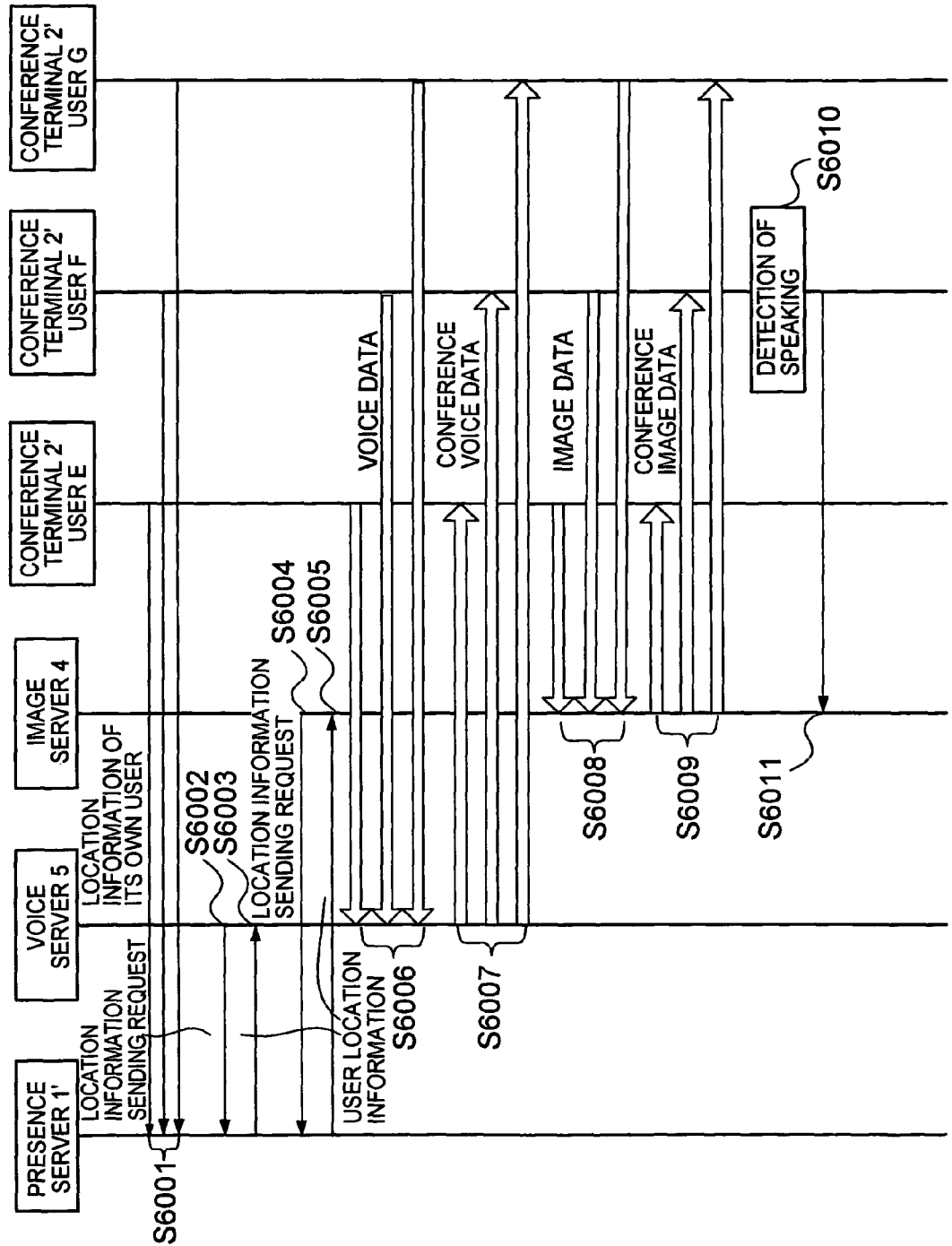

US 7,835,764 B2

VIDEO CONFERENCING SYSTEM, CONFERENCE TERMINAL AND IMAGE SERVER

CLAIM OF PRIORITY

The present invention claims priority from Japanese Patent Application No. JP2005-068917 filed Mar. 11, 2005, the content of which is hereby incorporated by reference into this application.

BACKGROUND OF THE INVENTION

The present invention relates to a video conferencing technique in which a conference terminal can output stereophonically-processed voices together with images of participants of a conference.

Patent Document 1 (U.S. Pat. No. 4,400,724) discloses an all-participants-displaying-type video conferencing system. In this all-participants-displaying-type video conferencing system, a video conference terminal of each participant is provided with display units as many as the number of the participants of a conference, to display respective images of the participants of the conference. Thus, the images of all the participants of the conference are always displayed.

Further, Patent Document 2 (U.S. Pat. No. 6,330,022) discloses a floor-control-type video conferencing system. In this floor-control-type video conferencing system, a speaking person is detected and the image of the speaking person is selected and displayed on a video conference terminal of each participant.

Further, Patent Document 3 (U.S. Pat. No. 6,327,567) discloses an audio teleconference system using a 3D audio technique. According to this audio teleconference system, a conference terminal of each participant of a conference outputs 3-audio-processed (stereophonically-processed) voice data of participants.

SUMMARY OF THE INVENTION

The all-participants-displaying-type video conferencing system described in Patent Document 1 requires a bandwidth of (n−1)×B, where B is a bandwidth required for displaying an image of one participant and n is the number of all the participants of a conference. The larger the number of participants of a conference becomes, the larger the required bandwidth becomes and the larger the cost of the system becomes.

On the other hand, in the floor-control-type video conferencing system described in Patent Document 2, the required bandwidth is only c×B, where B is a bandwidth required for displaying an image of one participant and c is the number of persons who speak simultaneously (c<n=the number of the participants of a conference). Thus, the required bandwidth becomes smaller in comparison with the all-participants-displaying-type video conferencing system. However, only speaking persons are displayed, and it is impossible to confirm a state of a key person (such as a chairperson) of the conference.

Further, the audio teleconference system described in Patent Document 3, which uses a 3D audio technique, does not use images. Thus, it is difficult for a participant of a conference to confirm states of the other participants.

The present invention has been made taking the above situations into consideration. An object of the present invention is to suppress a bandwidth required for a video conferencing system, and to make it easy to confirm a state of a key person or the like of a conference.

To solve the above problem, the present invention provides a presence server that manages, in a virtual space, locations of respective users of a plurality of conference terminals participating in a video conference. With respect to each conference terminal, the presence server is used to specify users located forward in relation to the location and direction, in the virtual space, of the user of the conference terminal in question. Then, the presence server makes the conference terminal in question display a conference screen that includes image data of each of the specified users.

For example, the present invention provides a video conferencing system comprising:

a plurality of conference terminals and a presence server for managing a location of a user of each of said plurality of conference terminals in a virtual space, wherein:

each of said plurality of conference terminals comprises:

an image data sending means, which sends image data of its-own-user, i.e. a user of the conference terminal in question (its-own conference terminal) to another conference terminal in response to an image sending request from said another conference terminal, i.e. a source of the request;

a location receiving means, which receives a location and a direction of said its-own-user in said virtual space;

a terminal side location information sending means, which sends its-own-user's virtual location information that includes the location and the direction received by said location receiving means to said presence server;

a terminal side location information receiving means, which receives virtual location information of each of other-users, i.e. users of conference terminals other than its-own conference terminal from said presence server;

a forward user detection means, which detects, as a forward user or forward users, at least one other-user located forward from its-own-user in the virtual space, based on said virtual location information of its-own-user and said virtual location information of each of the other-users;

an image data receiving means, which sends an image sending request to a conference terminal of each of the forward users detected by said forward user detection means and receives image data of each of said forward users from the conference terminal of the forward user in question; and a display control means, which displays, on a display, a conference screen that includes the image data (received by said image data receiving means) of each of said forward users; and said presence server comprises:

a management means, which manages users' virtual location information sent from each of said plurality of conference terminals; and a sever side location information sending means, which sends, to each of said plurality of conference terminals, the location information of the user of each of the conference terminals other than the conference terminal in question.

Further, the present invention provides a video conferencing system comprising:

a plurality of conference terminals, a presence server for managing a location of a user of each of said plurality of conference terminals in a virtual space, and an image server for sending image data to each of said plurality of conference terminals, wherein:

each of said plurality of conference terminals comprises:

a terminal side image data sending means, which sends image data of its-own-user, i.e., a user of the conference terminal in question (its-own conference terminal) to said image server;

a location receiving means, which receives a location and a direction of said its-own-user in said virtual space;

a terminal side location information sending means, which sends its-own-user's virtual location information that includes the location and the direction received by said location receiving means to said presence server;

a terminal side image data receiving means, which receives conference screen data from said image server; and a display control means, which displays, on a display, the conference screen data received by said terminal side image data receiving means;

said image server comprises:

an image server side image data receiving means, which receives image data of a user of each of said plurality of conference terminals;

an image server side location information receiving means, which receives virtual location information of each of said plurality of conference terminals from said presence server;

a forward user detection means, which detects, as a forward user or forward users, at least one other-user (i.e. a user other than a user of a conference terminal in question) located forward from its-own-user (i.e. the user of the conference terminal in question) in the virtual space, based on the virtual location information of its-own-user and the virtual location information of each of other-users, for each of said plurality of conference terminals; and an image server side image data sending means, which sends, to each of said plurality of conference terminals, conference screen data including the image data of each of the forward users detected in relation to the conference terminal in question by said forward user detection means, out of image data (received by said image sever side image data receiving means) of respective users of said plurality of conference terminals;

said presence server comprises:

a presence server side location information receiving means, which receives user's virtual location information sent from each of said plurality of conference terminals;

a management means, which manages user's virtual location information sent from each of said plurality of conference terminals; and a presence server side location information sending means, which sends the virtual location information of each of said plurality of conference terminals to said image server, with said virtual location information being managed by said management means.

According to the present invention, a conference terminal displays image data of each user located forward in relation to the location and direction of the user of that conference terminal. The location and direction of the user of the conference terminal in question are designated by that user. As a result, a required bandwidth can be reduced in comparison with a case where image data of all the users are displayed in a conference terminal. Further, when a user of a conference terminal designates his location and direction in a virtual space such that a desired user is located in front of him in the virtual space, it is possible to confirm a state of the desired user irrespective of existence or nonexistence of speaking of the desired user. Thus, according to the present invention, it is possible to suppress a required band at lower level and to confirm a state of a key person or the like of a conference easily.

BRIEF DESCRIPTION OF THE DRAWINGS

FIG. 3 is a diagram showing schematically contents of registration in a location information storage unit 104;

FIG. 4 is a flowchart for explaining operation of the presence server 1;

FIG. 19 is a schematic block diagram showing a voice server 5;

FIG. 20 is a schematic block diagram showing a conference terminal 2'; and

FIG. 21 is a diagram for explaining an outline of operation of the video conferencing system shown in FIG. 17.

DETAILED DESCRIPTION OF THE PREFERRED EMBODIMENTS

Now, embodiments of the present invention will be described.

First Embodiment

Figure 1:
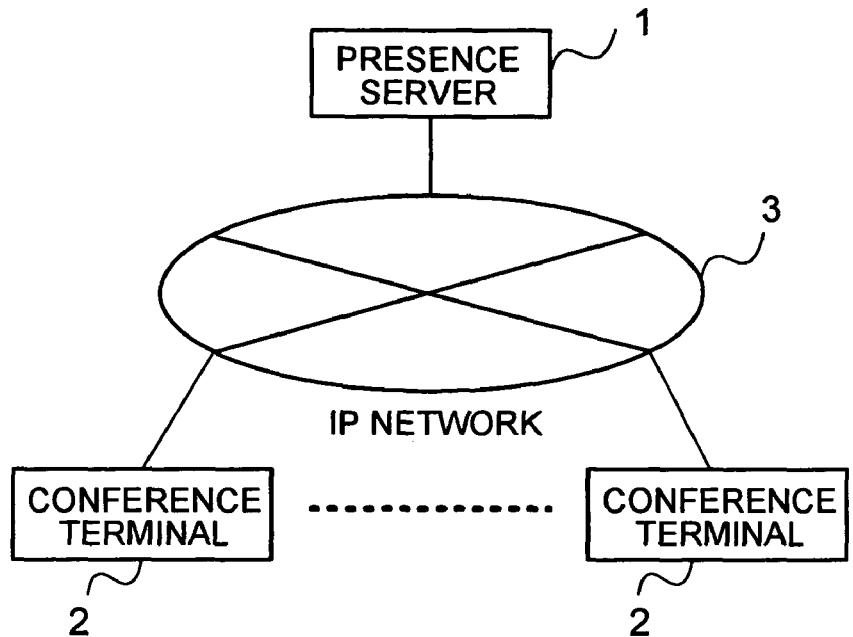
FIG. 1 is a schematic block diagram showing a video conferencing system of a first embodiment of the present invention.

FIG. 1 is a schematic block diagram showing a video conferencing system of a first embodiment of the present invention. As shown in the figure, the video conferencing system of the present embodiment comprises a presence server 1 and a plurality of conference terminals 2, with these component apparatuses 1 and 2 being connected with one another through an IP (Internet Protocol) network 3.

The presence server 1 manages location information of a user of each conference terminal 2 in a virtual space. Here, the virtual space is a virtually-generated space for the users of the conference terminals 2 to have a conference. The virtual space has properties such as: a size of the space; a height of a ceiling; reflectances, colors and textures of walls and the ceiling; reverberation properties; sound absorptance owing to air in the space; and the like.

Figure 2:
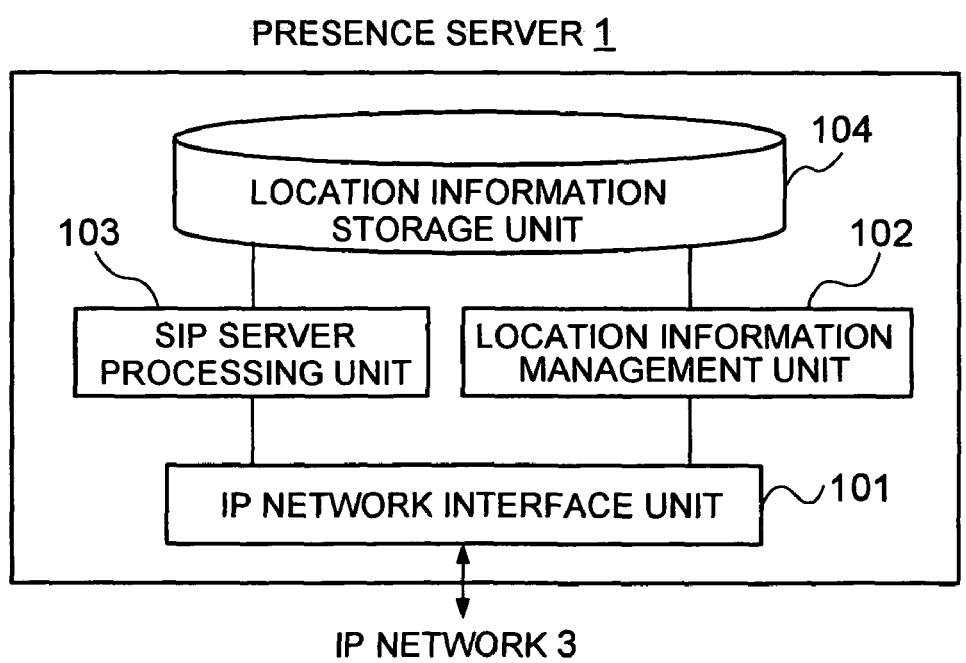
FIG. 2 is a schematic block diagram showing a presence server 1.

FIG. 2 is a schematic block diagram showing the presence server 1.

As shown in the figure, the presence server 1 comprises: an IP network interface unit 101 for connection to the IP network 3; a location information management unit 102; an SIP (Session Initiation Protocol) server processing unit 103; and a location information storage unit 104.

FIG. 3 is a diagram showing schematically contents of registration in the location information storage unit 104. As shown in the figure, the location information storage unit 104 stores a record 1040 for each user of a conference terminal 2. Each record 1040 has: a field 1041 for registering a user ID that identifies uniquely the user of the conference terminal 2 in question; a field 1042 for registering an image communication SIP-URI (Uniform Resource Identifier), i.e. an SIP-URI used by the conference terminal 2 in question for image communication; a field 1043 for registering an image communication IP address, i.e. an IP address corresponding to the image communication SIP-URI; a field 1044 for registering a voice communication SIP-URI, i.e. an SIP-URI used by the conference terminal 2 in question for voice communication; a field 1045 for registering a voice communication IP address corresponding to the voice communication SIP-URI; and a field 1046 for registering virtual location information, i.e. information on a location of the user of the conference terminal 2 in question in the virtual space. Here, the virtual location information includes coordinate information on a present location of the user in the virtual space and direction information on the direction in which the user is looking in the virtual space.

The location information management unit 102 searches for and updates a record 1040 registered in the location information storage unit 104. The SIP server processing unit 103 uses the associations between SIP-URIs and IP addresses registered in the location information storage unit 104, to send an INVITE message received from a conference terminal 2 on the sending side to a conference terminal 2 on the receiving side.

FIG. 4 is a flowchart for explaining operation of the presence server 1.

When the location information management unit 102 receives a user ID together with virtual location information from a conference terminal 2 through the IP network interface unit 101 (S1001), the location information management unit 102 searches the location information storage unit 104 for a record 1040 whose field 1041 registers the user ID in question from (S1002). Then, the location information management unit 102 updates the virtual location information registered in the field 1046 of the retrieved record 1040 into the received virtual location information (S1003).

Further, when the location information management unit 102 receives a location information sending request accompanied with a user ID from a conference terminal through the IP network interface unit 101 (S1004), the location information management unit 102 reads all the records 1040 other than the record 1040 whose field 1041 registers the user ID in question (S1005) and sends the read records 1040 to the conference terminal 2, i.e. the sender of the request (S1006). HH2079

Further, when the SIP server processing unit 103 receives an INVITE message accompanied with designation of a destination SIP-URI from a conference terminal 2 through the IP network interface unit 101 (S1007), the SIP server processing unit 103 searches the location information storage unit 104 for a record 1040 whose field 1042 or 1044 registers that SIP-URI (S1008). In the case where the field 1042 registers the SIP-URI, then the INVITE message is transferred to the destination at an IP address registered in the field 1043 of the retrieved record 1040. In the case where the field 1044 registers the SIP-URI, then the INVITE message is transferred to the destination at an IP address registered in the field 1045 of the retrieved record 1040 (S1009).

Figure 5:
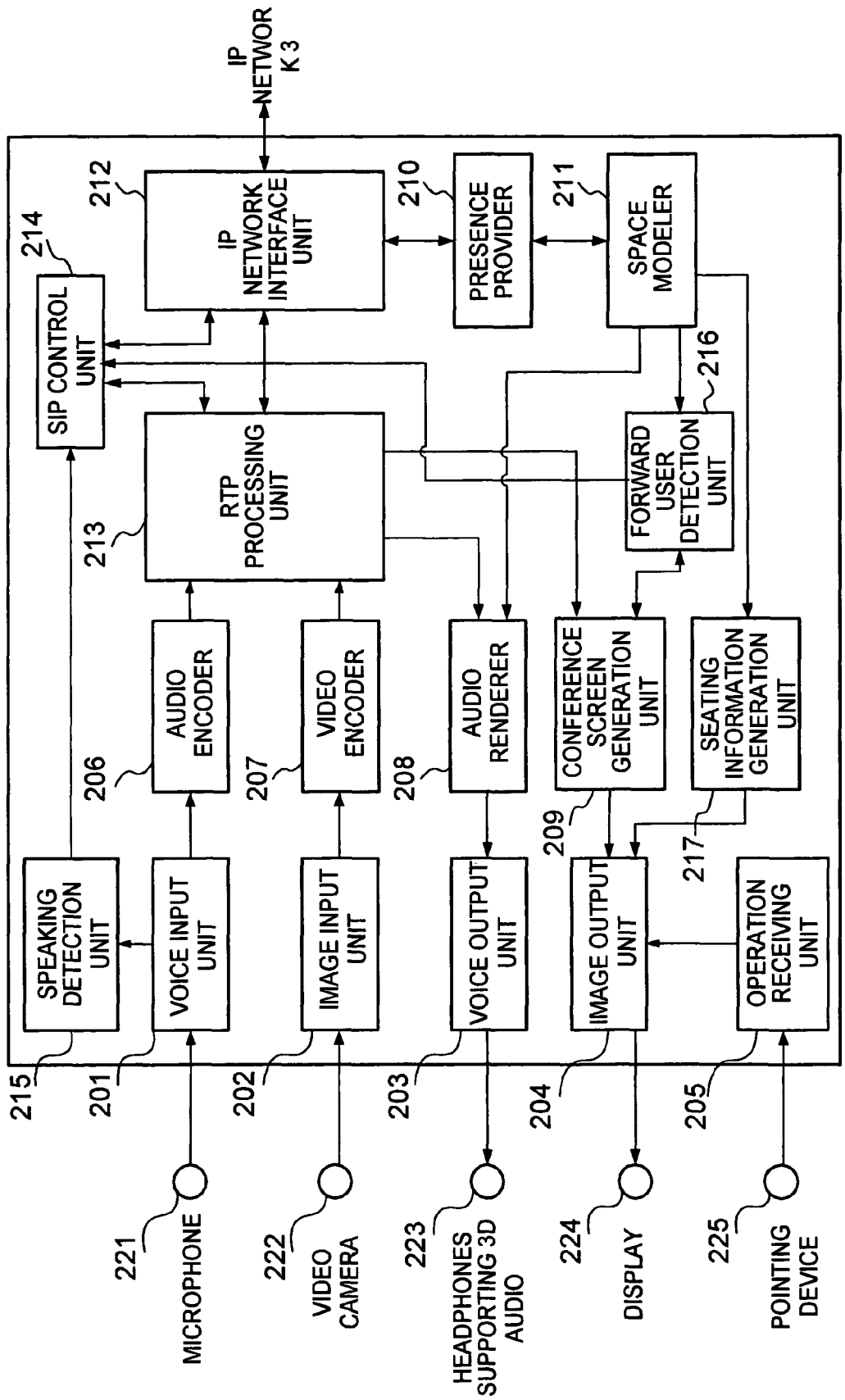
FIG. 5 is a schematic block diagram showing a conference terminal 2.

Each conference terminal 2 specifies users located forward in relation to the location and direction, in the virtual space, of the user of the conference terminal 2 itself. These location and direction of the user are designated by the user himself. Then, the conference terminal 2 displays a conference screen that includes image data of each of the specified users. FIG. 5 is a schematic block diagram showing a conference terminal 2.

As shown in the figure, the conference terminal 2 comprises: a voice input unit 201; an image input unit 202; a voice output unit 203; an image output unit 204; an operation receiving unit 205; an audio encoder 206; a video encoder 207; an audio renderer 208; a conference screen generation unit 209; a presence provider 210; a space modeler 211; an IP network interface unit 212 for connection to the IP network 3; an RTP (Real-time Transport Protocol) processing unit 213; an SIP control unit 214; a speaking detection unit 215; a forward user detection unit 216; and a seating information generation unit 217.

The voice input unit 210 is an input terminal for a voice signal acquired by a microphone 221. The image input unit 202 is an input terminal for an image signal acquired by a video camera 222. The voice output unit 203 is a voice output terminal to be connected with headphones (or speakers) 223 supporting 3 audio (for example, pseudo 5.1 channel). And, the operation receiving unit 205 receives user's operation of a pointing device 225.

The image output unit is an image output terminal to be connected to a display 224. When an instruction is received from a user through the pointing device 225 connected to the operation receiving unit 205, either the conference screen generation unit 209 or the seating information generation unit 217 is selected, and an image outputted from the selected generation unit 209 or 217 is displayed on the display 224.

The audio encoder 206 encodes the voice signal inputted to the voice input unit 201 and outputs voice data. The video encoder 207 encodes the image signal inputted to the image input unit 202 and outputs image data.

The RTP processing unit 213 places voice data outputted from the audio encoder in RTP packets, and sends the RTP packets through the IP network interface unit 212 to a destination IP address informed from the SIP control unit 214. Further, the RTP processing unit 213 places image data outputted from the video encoder 207 in RTP packets, and sends the RTP packets through the IP network interface unit 212 to a destination IP address informed from the SIP control unit 214. Further the RTP processing unit 213 extracts voice data from RTP packets received from another conference terminal 2 through the IP network interface unit 212, and outputs the extracted voice data together with the sender address of the RTP packets to the audio renderer 208. Further, the RTP processing unit 213 extracts image data from RTP packets received from another conference terminal through the IP network interface 212, and outputs the extracted image data together with the sender address of the RTP packets to the conference screen generation unit 209.

The speaking detection unit 215 monitors a voice signal inputted to the voice input unit 201 to detect existence of speaking of a user. When the speaking detection unit 215 detects speaking (i.e. a voice existing state), then the speaking detection unit 215 outputs a speaking detection signal to the SIP control unit 214. On the other hand, when a soundless state extending a predetermined period (for example, 10 seconds) is detected, the speaking detection unit 215 outputs a speaking stop signal to the SIP control unit 214.

In response to operation of the pointing device 225 by the user, the space modeler 211 determines the location (i.e. coordinates) and the viewing direction (i.e. orientation) of its own user based on the preset properties of the virtual space. Here, the operation of the pointing device 225 is received by the operation receiving unit 205. The space modeler 211 holds its user's virtual location information (which includes the determined location and viewing direction), and outputs the virtual location information of its user to the presence provider 210, the forward user detection unit 216, the seating information generation unit 217 and the audio renderer 208. Further, the space modeler 211 receives and holds virtual location information of each of the other users from the presence provider 210 and outputs the received virtual location information to the forward user detection unit 216, the seating information generation unit 217 and the audio renderer 208.

The presence provider 210 periodically sends its user's virtual location information received from the space modeler 211 to the presence server 1 through the IP network interface unit 210. Further, the presence provider 210 periodically sends a location information sending request to the presence server 1 through the IP network interface unit 212, and, in response, receives respective records 1040 of the other users from the presence server 1. Then, the presence provider 210 notifies the space modeler 211 of the received records 1040 of the other users.

The forward user detection unit 216 detects forward users i.e. other users located forward in relation to its own user in the virtual space, based on its own user's virtual location information and the virtual location information in each of the other users' records 1040 received from the space modeler 211. Further, the forward user detection unit 216 determines respective layout positions of the detected forward users in the below-mentioned conference screen. Then, the forward user detection unit 216 reports the detected forward users to the SIP control unit 214. At the same time, the forward user detection unit 216 reports the detected forward users and their respective layout positions to the conference screen generation unit 209.

Figure 6A:
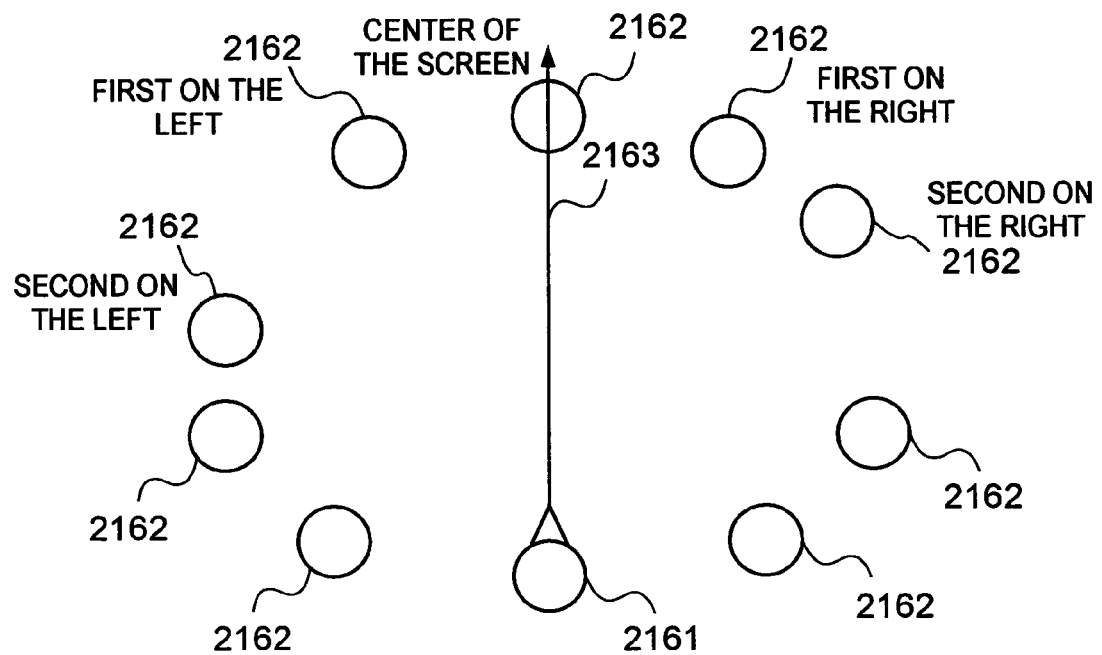
FIG. 6(A) is a diagram for explaining detection of forward users and determination of layout positions by a forward user detection unit 216.

In detail, as shown in FIG. 6(A), the forward user detection unit 216 first determines the location 2161 of its own user and the respective locations 2162 of the other users in the virtual space. Namely, the location of each user is determined at the coordinates included in the virtual location information of that user. Next, the forward user detection unit 216 determines the viewing direction 2163 of its own user as the orientation included in the virtual location information of its own user. Then, the forward user detection unit 216 determines a layout position of the forward user who is closest to the viewing direction 2163 at the center of the conference screen. Further, the forward user detection unit 216 determines that a forward user who is located n-th to the right from the user of the center layout position occupies the n-th layout position of the conference screen to the right from the center of the conference screen, and that a forward user who is located n-th to the left from the user of the center layout position occupies the n-th layout position of the conference screen to the left from the center of the conference screen. This processing is repeated until n becomes a predetermined number (a number that is determined in accordance with the number of image display frames provided for forward users in the below-mentioned conference screen). Next, the forward user detection unit 216 reports the user ID included in the record 1040 of each forward user to the SIP control unit 214. Further, for each forward user, the forward user detection unit 216 generates forward user information that includes the user ID and the image communication IP address (both included in the record 1040 of the forward user in question) and the layout position of that forward user in the conference screen, and sends the generated forward user information to the conference screen generation unit 209.

Further, the forward user detection unit 216 determines that another user's record 1040 whose image communication IP address is same as a source IP address received from the conference screen generation unit 217 is a record 1040 of a speaking user, and determines a layout position of the speaking user in the below-mentioned conference screen. Then, the forward user detection unit 216 reports the layout position of the speaking user to the conference screen generation unit 209.

Figure 6B:
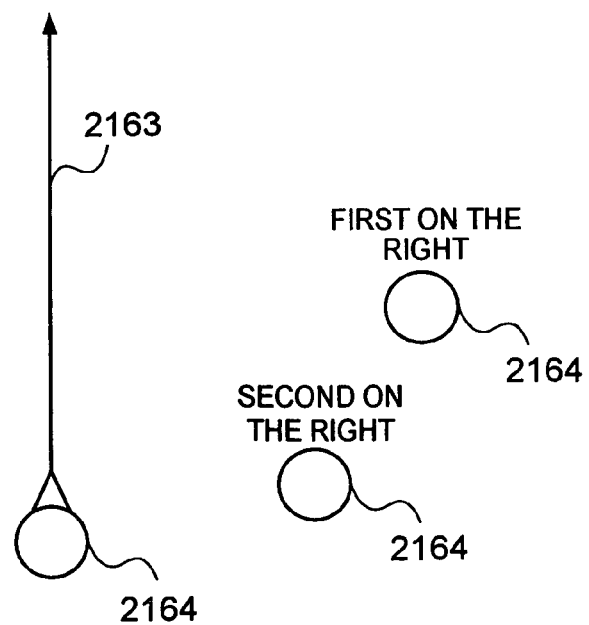
FIG. 6(B) is a diagram for explaining determination of a layout position of a speaking user by the forward user detection unit 216.

In detail, as shown in FIG. 6(B), the forward user detection unit 216 first determines the location 2161 of its own user and the respective locations 2164 of speaking users in the virtual space. Namely, the location of each user is determined at the coordinates included in the virtual location information of that user. Next, the forward user detection unit 216 determines the viewing direction 2163 of its own user as the orientation included in the virtual location information of its own user. Then, the forward user detection unit 216 determines a layout position of each speaking user in the conference screen, depending on whether the speaking user in question is located on the right side or left side of the viewing direction 2163 of its own user and depending on which number is the speaking user in question on the right or left side. For example, with respect to a speaking user located second on the right of the viewing direction 2163, his layout position in the conference screen is determined as the second layout position from the center of the screen on the right side of the forward users. Then, for each speaking user, the forward user detection unit 216 generates speaking user information that includes the user ID and the image communication IP address (both included in the record 1040 of the speaking user in question) and the layout position of that speaking user in the conference screen, and sends the generated speaking user information to the conference screen generation unit 209.

Figure 7:
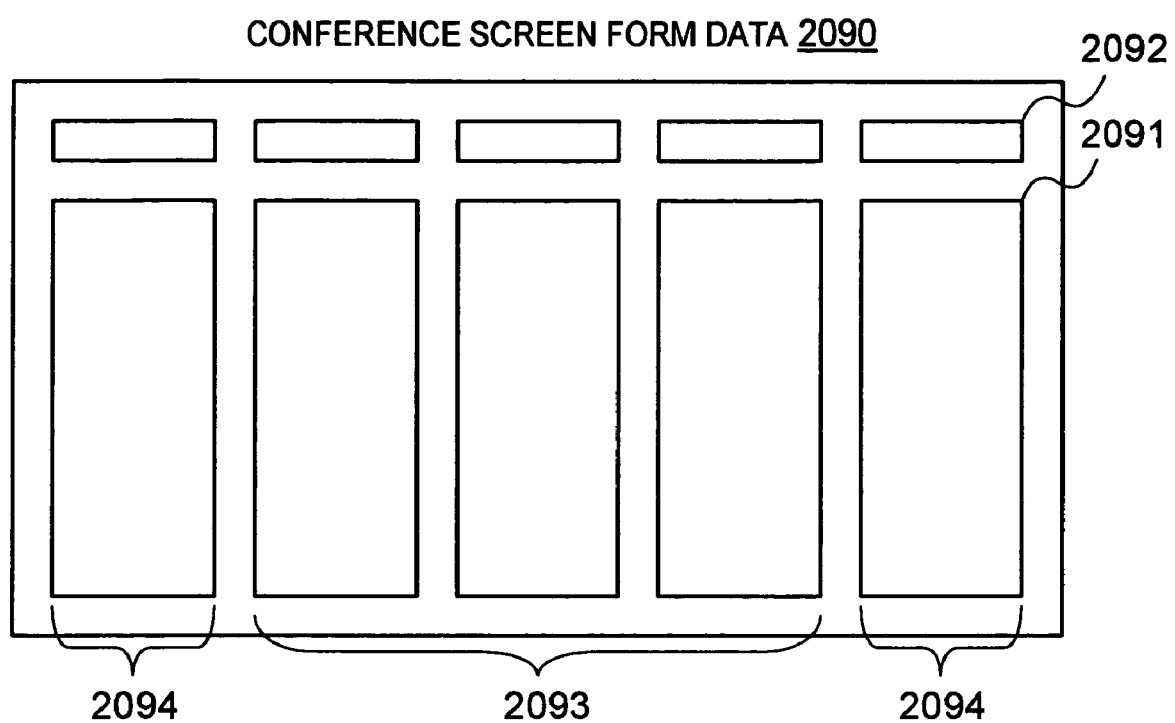
FIG. 7 is diagram showing an example of display of conference screen form data 2090.

The conference screen generation unit 209 holds conference screen form data. FIG. 7 is a diagram showing an example of display of conference screen form data 2090. In this example, the conference screen form data 2090 comprises a plurality of sets of a user image display frame 2091 and a user ID display field 2092. Among these sets, a plurality of sets 2093 (three sets in the case of FIG. 3) arranged in the central part of the screen are sets each for displaying the image data and the user ID of a forward user. Further, one or more sets 2094 (one set in the case of FIG. 7) arranged on each side (i.e. the right or left side) of these sets 2093 is (are) a set(s) for displaying image data and a user ID of a speaking user other than the forward users. The conference screen generation unit 209 displays the conference screen form data 2090 on the display 224 through the image output unit 204. Further, the conference screen generation unit 209 displays each image data received together with its source address from the RTP processing unit 213 in one of the plurality of sets 2093 when the image data in question is data of a forward user, or in one of the above-mentioned one or more sets 2094 when the image data in question is data of a speaking user other than the forward users. Here, the user ID of the forward user or the speaking user, as the case may be, is displayed together with the image data.

Figure 8:
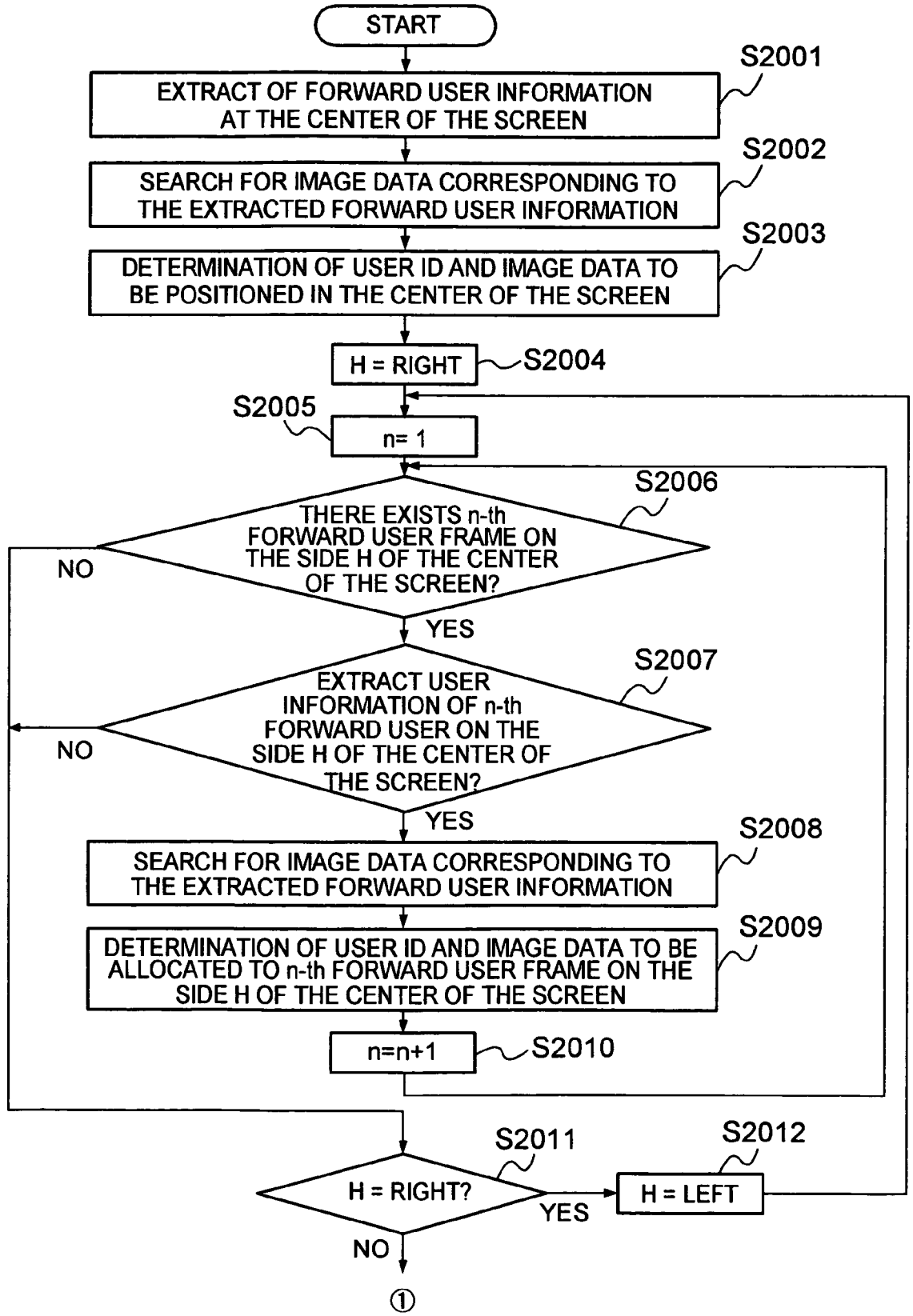
FIG. 8 is a flowchart for explaining operation of a conference screen generation unit 209.
Figure 9:
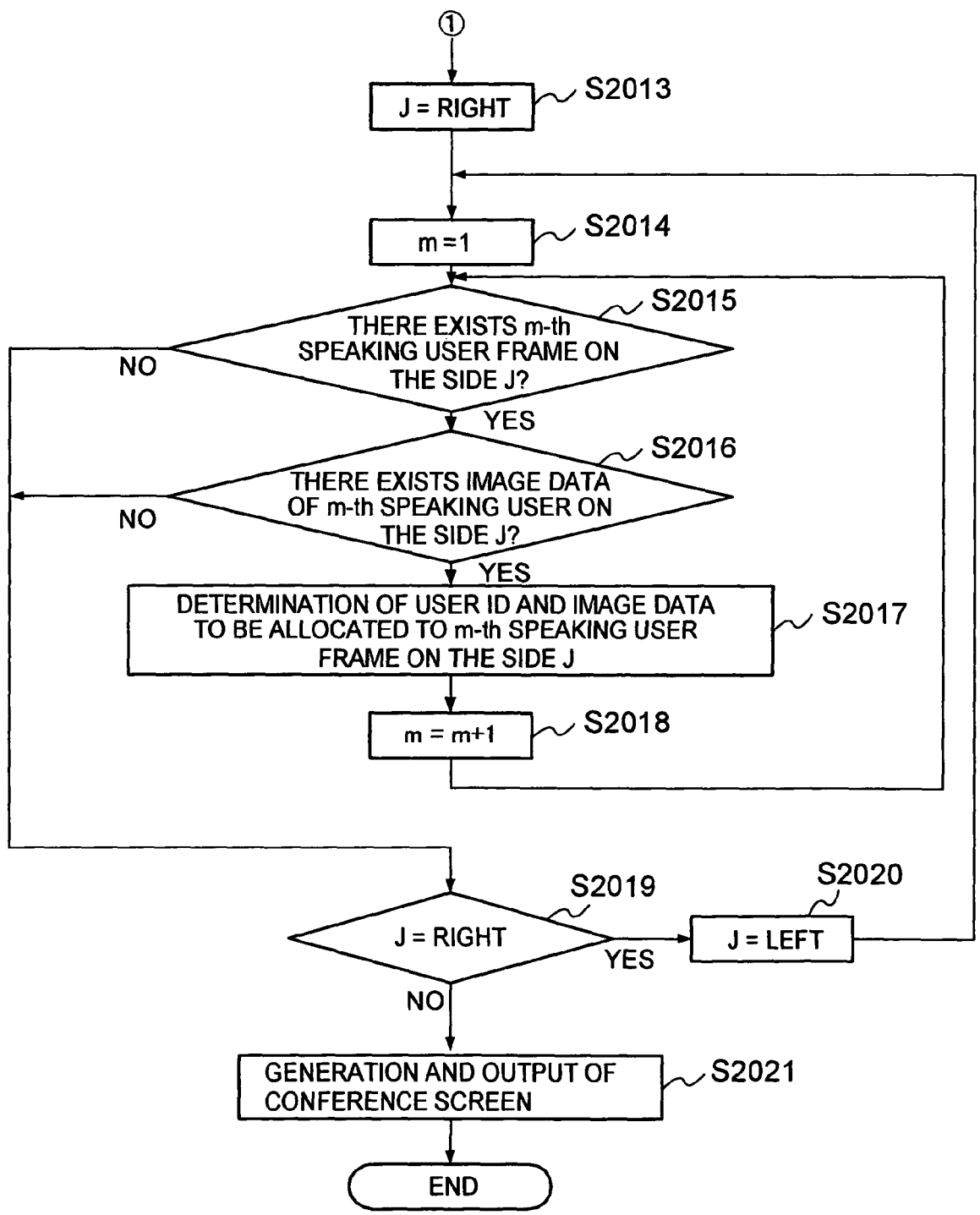
FIG. 9 is a flowchart for explaining operation of the conference screen generation unit 209.

FIGS. 8 and 9 are flowcharts for explaining operation of the conference screen generation unit 209.

First, the conference screen generation unit 209 extracts forward user information whose layout position is the center of the conference screen among pieces of forward user information received from the forward user detection unit 216 (S2001). Next, the conference screen generation unit 209 searches for image data whose source address is the image communication IP address of the extracted forward user information among image data received together with respective source addresses from the RTP processing unit 213 (S2002). Then, the conference screen generation unit 209 determines a layout position of the user ID of the forward user information extracted in S2001 and the image data retrieved in S2003 as the user ID display field 2092 and the user image display frame 2091 of the set positioned at the center among the plurality of sets 2093 in the conference screen form data 2090 (S2003).

Next, the conference screen generation unit 209 sets a value H to Right (or Left) (S2004). The value H indicates whether a noted set is positioned on the right or left side of the center of the screen. Further, the conference screen generation unit 209 sets a counter value n to 1 (S2005). Next, the conference screen generation unit 209 examines whether there exists the n-th set from the set positioned at the center on the side determined by the value H among the above-mentioned plurality of sets 2093 in the conference screen form data 2090 (S2006). When such set does not exist, the flow proceeds to S2011. On the other hand, when such set exists, then the conference screen generation unit 209 extracts forward user information data whose layout position in the conference screen is the n-th position from the center of the screen on the side determined by the value H among pieces of forward user information received from the forward user detection unit 216 (S2007). When such forward user information can not be extracted, the flow proceeds to S2011. On the other hand, when such forward user information can be extracted, then the conference screen generation unit 209 searches for image data whose source address is the image communication IP address of the extracted forward user information among the image data received together with respective source addresses from the RTP processing unit 213 (S2008). Then, the conference screen generation unit 209 determines a layout position of the user ID of the forward user information extracted in S2007 and the image data retrieved in S2008 as the user ID display field 2092 and the user image display frame 2091 of the n-th set from the set positioned at the center on the side H among the plurality of sets 2093 in the conference screen form data 2090 (S2009). Then, the conference screen generation unit 209 increments the counter value n by one (S2010), and returns to S2006

In S2011, the conference screen generation unit 209 examines whether the value H is Right (or Left). When the value H is Right (or Left), the conference screen generation unit 209 changes the value H to Left (or Right) (S2012), and returns to S2005. On the other hand, when the value H is not Right (or Left), i.e. when the above-described steps S2005-S2010 have been executed for both values (Right and Left) of H, the flow proceeds to S2013.

In S2013, the conference screen generation unit 209 sets a value J to Right (or Left). The value J indicates whether a noted set is positioned on the right or left side of the center of the screen. Further, the conference screen generation unit 209 sets a counter value m to 1 (S2014). Next, the conference screen generation unit 209 examines whether there exists the m-th set from center of the screen on the side determined by the value J among the above-mentioned one or more sets 2094 positioned on the side determined by the value J in the conference screen form data 2090 (S2015). When such set does not exist, the flow proceeds to S2019. On the other hand, when such set exists, then the conference screen generation unit 209 searches for image data of a speaking user other than the forward users, which has the m-th layout position from the center of the screen on the side J of the layout positions of the forward users, among the image data received together with respective source addresses from the RTP processing unit 213 (S2016).

In detail, the conference screen generation unit 209 searches for image data whose source address is different from the image communication IP addresses of the forward user information received from the forward user detection unit 216, among the image data received together with respective source address from the RTP processing unit 213. Next, the conference screen generation unit 209 reports the source address of each retrieved image data to the forward user detection unit 216 to acquire speaking user information corresponding to each source address. Then, the conference screen generation unit 209 specifies the speaking user information whose layout position is m-th from the center of the screen on the side J of the layout positions of the forward users among the acquired pieces of speaking user information. Then, the conference screen generation unit 209 determines the image data whose source address is the image communication IP address of the specified speaking user information, as the image data of the speaking user other than the forward users, which has the m-th layout position from the center of the screen on the side J of the layout positions of the forward users.

Next, the conference screen generation unit 209 determines a layout position of the image data specified in S2016 and the user ID of the speaking user information whose image communication IP address is the source address of the specified image data, as the m-th set of the user image display frame 2091 and the user ID display field 2092 from the center of the screen on the side J among the above-mentioned one or more sets 2094 positioned on the side J in the conference screen form data 2090 (S2017). Then, the conference screen generation unit 209 increments the counter value m by one (S2018), and returns to S2015.

Figure 10:
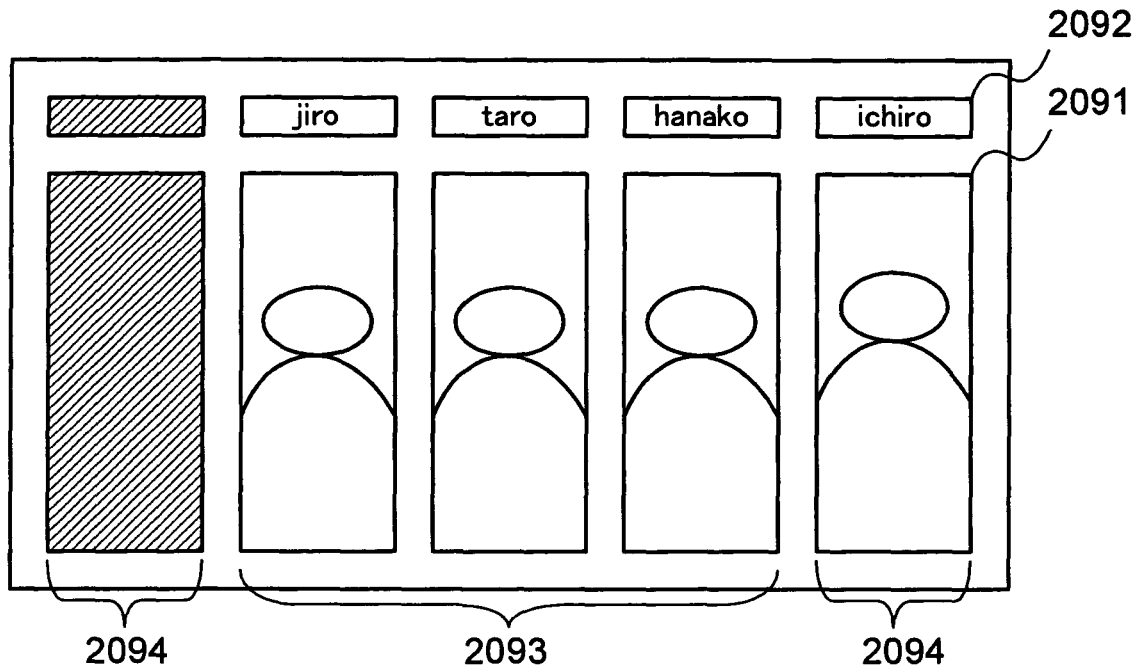
FIG. 10 is a diagram showing an example of display of conference screen data.

In S2019, the conference screen generation unit 209 examines whether the value J is Right (or Left). When the value J is Right (or Left), the conference screen generation unit 209 changes the value J to Left (or Right) (S2020), and returns to S2014. On the other hand, when the value J is not Right (or Left), i.e. when the above-described steps S2014-S2018 have been executed for both values (Right and Left) of J, then the conference screen generation unit 209 assigns each set of the user ID and the image data determined in S2009 and S2017 to the corresponding set of the user image display frame 2091 and the user ID display field 2092 of the conference screen form data 2090, to generate conference screen data as shown in FIG. 10. Then, the conference screen generation unit 209 outputs the generated conference screen data to the display 224 through the image output unit 204 (S2021). In the example of the conference screen data shown in FIG. 10, image data of three forward users (jiro, taro and hanako) are shown, and further image data of a speaking user (ichiro) located 1st on the right of the user himself of the conference terminal in question in the virtual space. In this example, a speaking user located on the left of the user of the conference terminal in question does not exist, and thus a user ID and image data are not shown in the set 2094 on the left of the screen.

Figure 11:
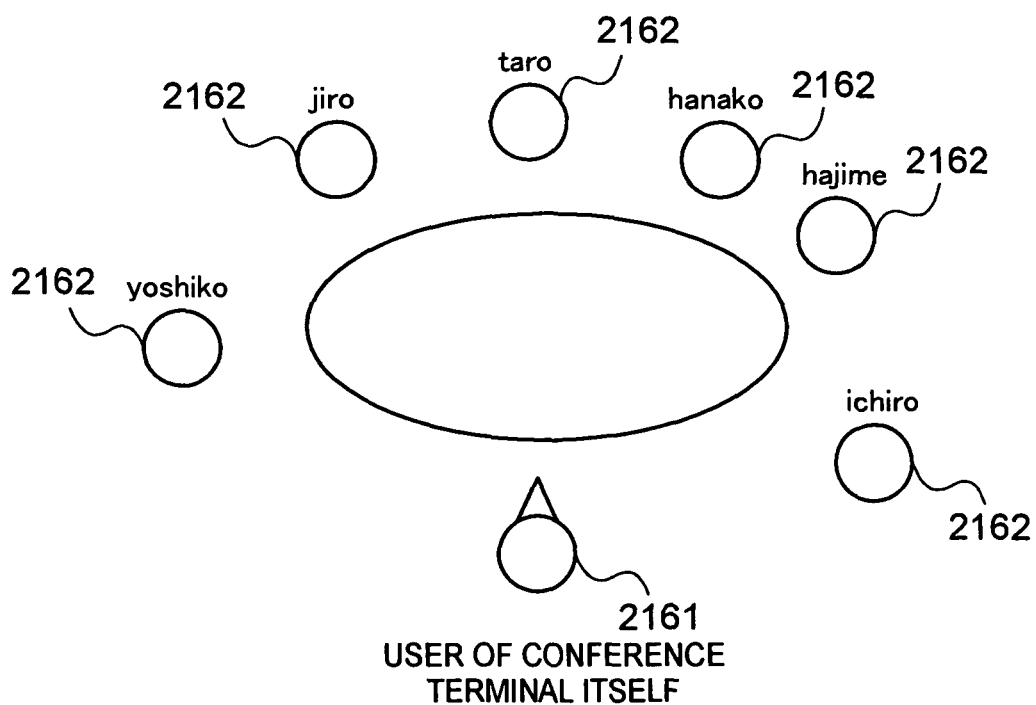
FIG. 11 is a diagram showing an example of display of seating information display data.

The description will be continued returning to FIG. 5. The seating information generation unit 217 generates seating information display data indicating the layout position 2161 of its own user ant the layout positions 2162 of other users in the virtual space as shown in FIG. 11 for example, based on the virtual location information of its own user and the virtual location information of the respective records 1040 of other users received from the space modeler 211. Then, the seating information generation unit 217 displays the generated seating information display data on the display 224 through the image output unit 204.

The audio renderer 208 receives each voice data together with its source address from the RTP processing unit 213. Then, the audio renderer 208 buffers each voice data received to synchronize (associate with one another) the received voice data. The method of this buffering (play out buffering) is described in Colin Perkins, RTP: Audio and Video for the Internet, Addison-Wesley Pub. Co.; 1st edition (Jun. 11, 2003), for example. Further, the audio renderer 208 makes each synchronized voice data stereophonic based on relative positions of the other users to its own user in the virtual space. These relative positions are specified by the virtual location information of the other users' records 1040 received from the space modeler 211 and the virtual location information of its own user. Then, the audio renderer 208 outputs 2-channel (i.e. left and right channels) signal data (signal sequence) to the headphones 223 that supports 3 audio and is connected to the voice output unit 203.

The audio renderer 208 will be described in greater detail. In the 3 audio technique, a direction and a distance of a sound are expressed by HRIR (Head Related Impulse Response), which expresses how sound changes (impulse response) around a head of a person (hereinafter referred to as a human head), and pseudo reverberation generated by a virtual environment representing, for example, a room. HRIR is determined by a distance between a sound source and a human head and angles (a horizontal angle and a vertical angle) of the sound source with the human head. Here, it is assumed that the audio renderer 208 previously stores values of HRIR measured for each distance and each angle using a dummy head. Further, as a value of HRIR, different values are used for the left channel (a value measured at the left ear of the dummy head) and the right channel (a value measured at the right ear of the dummy head) in order to express a sense of left-and-right, front-and-rear or up-and-down direction.

Figure 12:
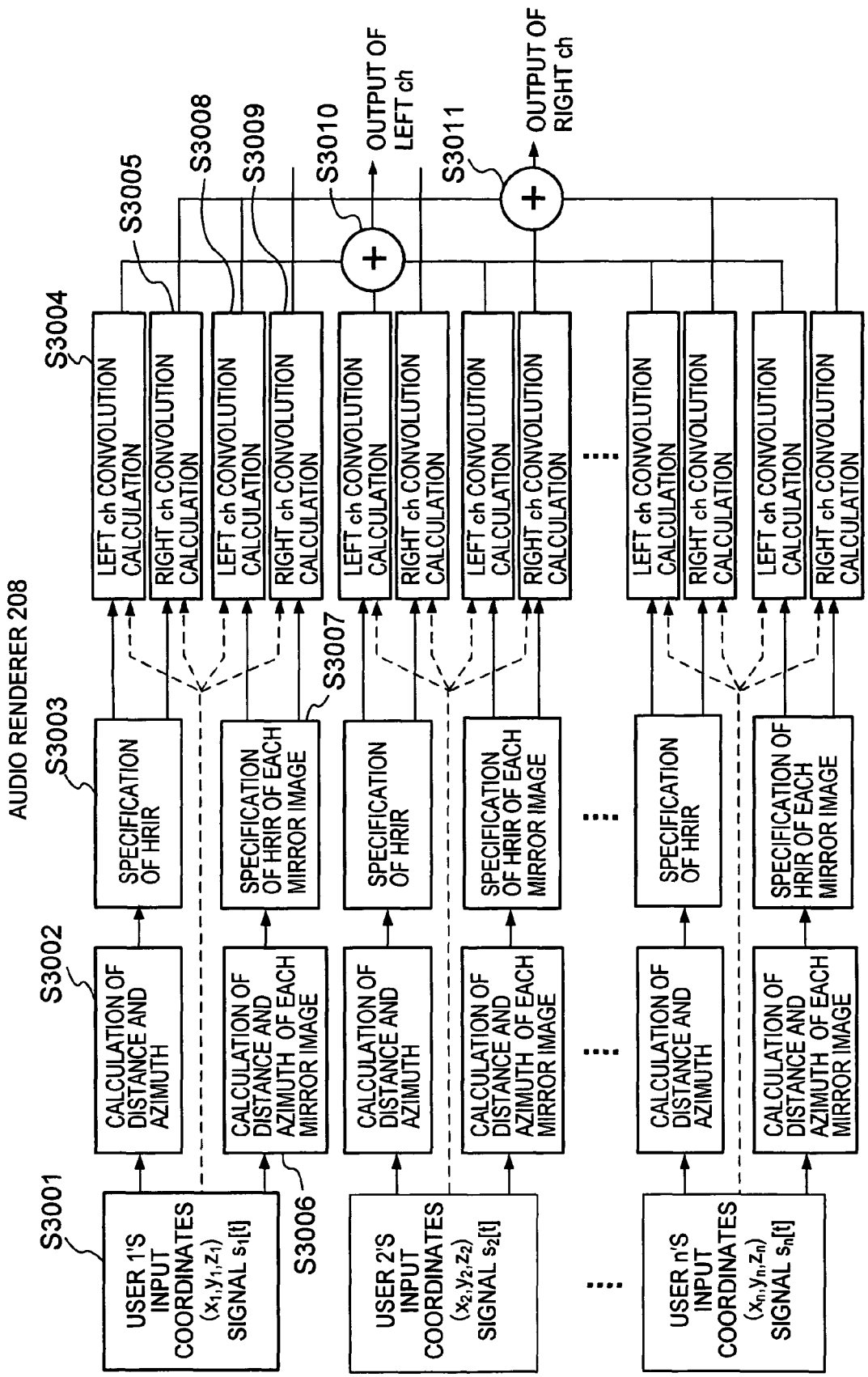
FIG. 12 is a diagram for explaining processing in an audio renderer 208.

FIG. 12 is a diagram for explaining processing in the audio renderer 208. With respect to each voice data sent together with its source address from the RTP processing unit 213, the audio renderer 208 performs the following calculation for each source address.

First, for each source address, the audio renderer 208 receives a signal sequence $s_i[t]$ (t=1, . . . ) of voice data associated with that source address from the RTP processing unit 213. Further, for each source address, the audio renderer 208 searches for a record 1040 whose voice communication IP address is that source address among the other users' records 1040 received from the space modeler 211. Then, the audio renderer 208 sets the virtual location information of the retrieved record 1040, its own user's virtual location information received from the space modeler 211, and the signal sequence $s_i[t]$ (t=1, . . . ) of the voice data associated the source address in question, as parameters to be used for 3 audio processing (S3001).

Next, the audio renderer 208 calculates a direct sound of the voice data and a reflected sound as reverberation of the voice data for each source address. With respect to the direct sound, the audio renderer 208 calculates the distance and the azimuth between its own user and the user having the source address in question, using the location information set as the parameters (S3002). Then, the audio renderer 208 specifies HRIR corresponding to the distance and azimuth of that user from its own user among the previously-stored HRIR values (S3003). Or the audio renderer 208 may use HRIR values obtained by interpolation based on the previously-stored HRIR values.

Next, the audio renderer 208 performs convolution calculation using the signal sequence inputted in S3001 and the left channel HRIR of the HRIR specified in S3003, to generate a left channel signal (S3004). Similarly, the audio renderer 208 performs convolution calculation using the signal sequence inputted in S3001 and the right channel HRIR of the HRIR specified in S3003, to generate a right channel signal (S3005).

Further, as for the reverberating sound, the audio renderer 208 calculates reverberation to be added, using the local information set as the parameters in S3001 (S3006 and S3007). Namely, the audio renderer 208 calculates reverberation based on how sound changes (impulse response) according to the properties of the virtual space. Now, calculation of reverberation will be described.

Reverberation consists of early reflection and late reverberation. And it is generally accepted that early reflection is more important than late reverberation in forming senses of (i.e. in recognizing) distance to another user, size of a room (virtual space), and the like. It is said that, inside a room in the real space, after one hears a sound coming directly from a sound source (a direct sound), one can hear several tens of early reflections from walls, ceiling, floor and the like in a period of several ms through 100 ms under some conditions. When the shape of a room is a rectangular parallelepiped, only six early reflections can be heard at one time. However, in a room of a more complex shape or a room having furniture or the like, the number of reflected sounds becomes larger, and a sound reflected many times by walls or the like may be heard.

As a method of calculating early reflection, the image source method may be mentioned. This method is described, for example, in Allen, J. B. and Berkley, A., "Image Method for efficiently Simulating Small-Room Acoustics", J. Acoustical Society of America, Vol. 65, No. 4, pp. 943-950, Apr. 1979. In a simple image source method, walls, ceiling and floor of a room are considered as mirror surfaces, and a reflected sound is calculated taking it as a sound from a sound source image existing on the opposite side of a mirror surface.

Figure 13:
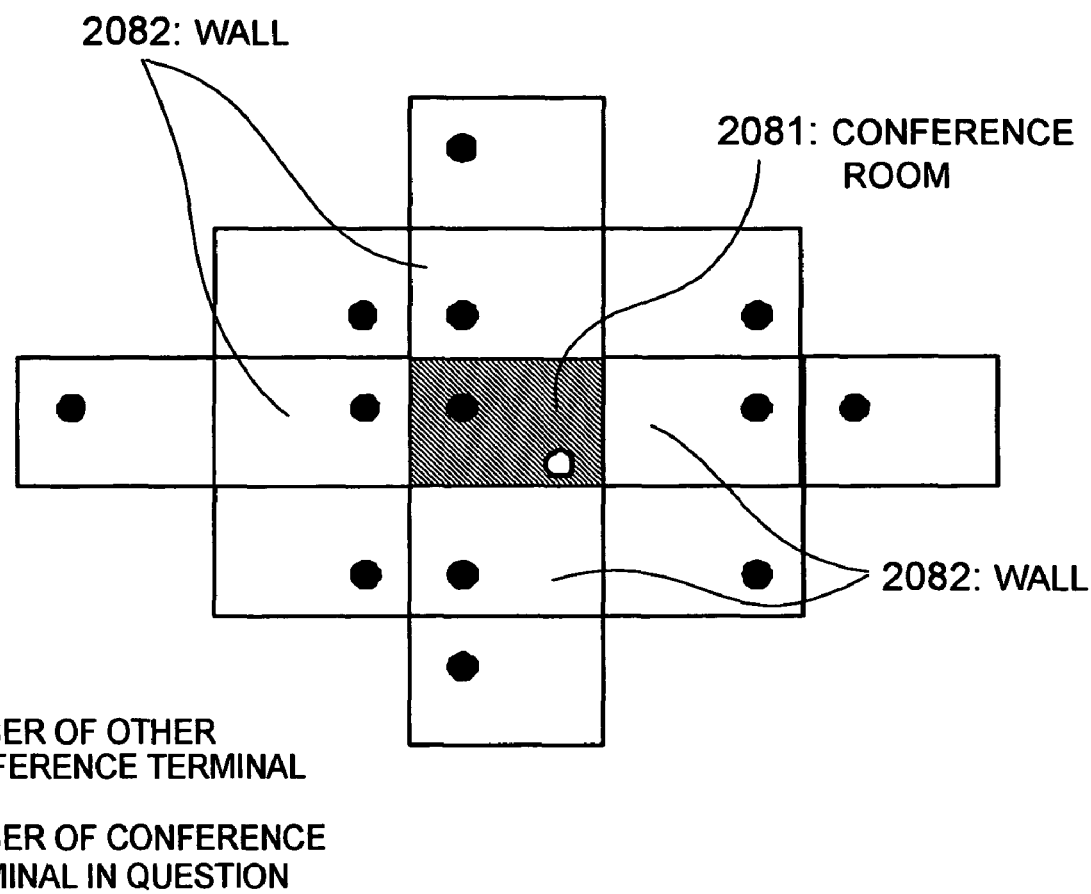
FIG. 13 is a diagram schematically illustrating the two-dimensional image source method omitting ceiling and floor.

FIG. 13 is a diagram schematically illustrating the two-dimensional image source method omitting a ceiling and floor for the sake of simplification. Namely, an original conference room (i.e. virtual space) 2081 is depicted in the center, and a user in question and the other user exist in the conference room 2081. And, twelve mirror images including walls 2082 of the room are depicted around the room 2081. It is not necessary that the number of mirror images is twelve, and may be more or less.

The audio renderer 208 calculates a distance and direction from each image of the other user to the user in question assuming that a sound from an image of the other user in a mirror image goes straight to the user in question (listener) (S3006). Sound intensity is in inverse proportion to distance. Thus, the audio renderer 208 fades out each volume according to distance. However, assuming that the reflection factor of a wall is $\alpha$ ($0 \leq \alpha \leq 1$), a sound sample reflected by the walls n times is multiplied by $\alpha^n$ to fade the sound volume furthermore.

Here, as the value of the reflection factor $\alpha$, a value of about 0.6 is used. The value of about 0.6 is used in order to acquire sufficient reverberation (i.e. a ratio of reflected sound to direct sound) for recognizing a distance between the user in question and the other user. As another reason, when the value of α is too large, the sense of direction of the user in question becomes duller.

Next, for each of the other users' images, the audio renderer 208 specifies HRIR corresponding to the distance and azimuth from its own user among the previously-stored HRIR values (S3007). Since reflected sounds reach the human head from respective different directions, it is necessary to apply HRIR different from the HRIR specified in S3003 for the direct sound.

When the below-mentioned convolution calculation (S3007 and S3008) is performed using different HRIR for each of many reflected sounds, a vast amount of calculation is required. To prevent increase of calculation amount, it is possible to apply HRIR for a sound source located in the front irrespective of the real direction of the sound source. In that case, calculation of HRIR can be replaced by a small amount of calculation of only a time difference (ITD: inter-aural time difference) and an intensity difference (IID: inter-aural intensity difference) of a sound reaching the left and right ears.

Next, the audio renderer 208 performs convolution calculation using the signal sequence inputted in S3001 and the left channel HRIR of the HRIR specified in S3007, to generate reverberation of the left channel signal (S3008). Similarly, the audio renderer 206 performs convolution calculation using the signal sequence inputted in S3001 and the right channel HRIR of the HRIR specified in S3007, to generate reverberation of the right channel signal (S3009).

When the audio renderer 208 calculates the left channel signals of all the other users (source addresses) as described above, then the audio renderer 208 adds all the left channel signals (S3010). Here, each left channel signal includes the direct sound calculated in S3004 and the reflected sound calculated in S3008.

Similarly, the audio renderer 208 calculates the right channel signals of all the other users (source addresses) as described above, then the audio renderer 208 adds all the right channel signals (S3011). Here, each right channel signal includes the direct sound calculated in S3005 and the reflected sound calculated in S3009.

The HRIR calculation (S3003 and S3007) is performed for each RTP packet of voice data. However, in the case of the convolution calculation (S3004, S3005, S3008 and S3009), there arises a part that should be carried to the next packet of voice data. As a result, it is necessary to hold the specified HRIR or the inputted signal sequence until processing of the next packet of the voice data.

Thus, the audio renderer 208 performs processing such as adjustment of volume, superposition of reverberation and echo, filtering, and the like according to the above-described calculation for each of the other users' voice data sent from the RTP processing unit 213, to give acoustic effects for acquiring sound that should be heard at the location of its own user in the virtual space. Namely, the audio renderer 208 generates stereophonic sound in which voices are located according to the processing based on the virtual space properties and relative positions of the other users.

Returning to FIG. 5, the description will be continued. The SIP control unit 214 holds a table that registers a user ID, a voice communication SIP-URI and an image communication SIP-URI for each of the other conference terminals 2. When necessary, the SIP control unit 214 uses this table to establish a voice communication connection and an image communication connection with another conference terminal 2.

Figure 14:
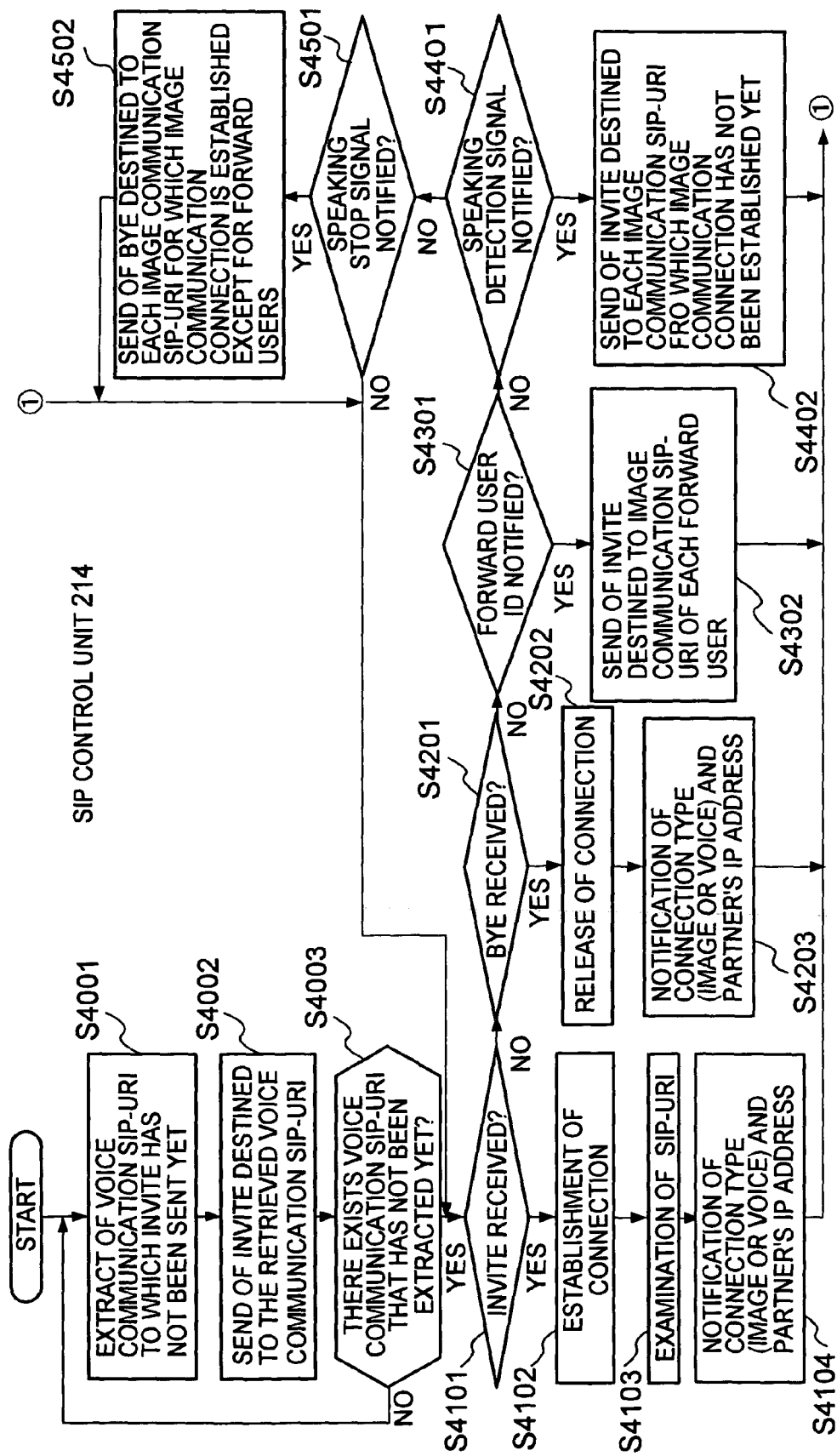
FIG. 14 is a flowchart for explaining operation of an SIP control unit 214.

FIG. 14 is a flowchart for explaining operation of the SIP control unit 214.

At the time of activation of the conference terminal 2, the SIP control unit 214 establishes a voice communication connection with each conference terminal 2 participating in a conference. First, the SIP control unit 214 extracts a voice communication SIP-URI that has not been extracted yet among voice communication SIP-URI registered in its table (S4001). Next, the SIP control unit 214 sends an INVITE message whose destination is the extracted voice communication SIP-URI to the presence server through the IP network interface unit 214, for trying to establish a voice communication connection with the conference terminal 2 having the voice communication SIP-URI (S4002). Next, the SIP control unit 214 examines whether all the voice communication SIP-URIs registered in its table have been extracted (S4003). In the case where all the voice communication SIP-URIs have not been extracted yet, the SIP control unit 214 returns to S4001. On the other hand, in the case where all the voice communication SIP-URIs have been extracted, the SIP control unit 214 ends the processing of establishing voice communication connections at the time of activation, and proceeds to a state of waiting for various event.

When the SIP control unit 214 receives an INVITE message from the IP network 3 through the IP network interface unit 212 (S4101), then the SIP control unit 214 executes a call control sequence in accordance with SIP directed to the conference terminal 2 as the source (sending side) of the INVITE message, to establish a connection with that conference terminal 2 (S4102). Further, the SIP control unit 214 examines whether the SIP-URI of its own conference terminal 2 designated as the destination in the INVITE message is the image communication SIP-URI or the voice communication SIP-URI (S4103). When the designated SIP-URI is the image communication SIP-URI, the SIP control unit 214 informs the RTP processing unit 213 of the establishment of the image communication connection together with the IP address of the conference terminal 2 as the communication partner of that connection. On the other hand, when the designated SIP-URI is the voice communication SIP-URI, the SIP control unit 214 informs the RTP processing unit 213 of the establishment of the voice communication connection together with the IP address of the conference terminal 2 as the communication partner of that connection (S4104).

Further, when the SIP control unit 214 receives, through the IP network interface unit 212, a BYE message from a conference terminal 2 as a communication partner with which a connection has been established (S4201), then the SIP control unit 214 executes a call control sequence in accordance with SIP directed to the conference terminal 2 as the communication partner, to release the connection with that conference terminal 2 (S4202). Further, the SIP control unit 214 informs the RTP processing unit 213 of the type (i.e. either image communication connection or voice communication connection) of the released connection and the IP address of the conference terminal 2 as the communication partner using that connection, in order to make the RTP processing unit 213 finish sending and receiving of RTP packets storing designated type of data to and from the conference terminal 2 as the communication partner having that IP address (S4203).

Further, when the SIP control unit 214 is notified of a user ID of a forward user by the forward user detection unit 216 (S4301), then the SIP control unit 214 specifies the image communication SIP-URI registered in association with that user ID in its own table. The SIP control unit 214 sends an INVITE message whose destination is the specified image communication SIP-URI to the presence server 2 through the IP network interface unit 212, for trying to establish an image communication connection with the conference terminal 2 having the image communication SIP-URI (i.e. the conference terminal 2 of the forward user) (S4302).

Further, when the SIP control unit 214 receives a speaking detection signal from the speaking detection unit 215 (S4401), then the SIP control unit 214 specifies image communication SIP-URIs for which an image communication connection has not been established among the image communication SIP-URIs registered in its own table. Then, the SIP control unit 214 sends INVITE messages whose destinations are respectively the specified image communication SIP-URIs to the presence server 2 through the IP network interface unit 212, for trying to establish image communication connections with the conference terminals 2 having those image communication SIP-URIs (i.e. terminals of users other than the forward users) (S4402).

Further, when the SIP control unit 214 receives a speaking stop signal from the speaking detection unit 215 (S4501), then the SIP control unit 214 specifies image communication SIP-URIs of users other than the forward users, for which image communication connections are established, among the image communication SIP-URIs registered in its own table. Then, the SIP control unit 214 sends BYE messages whose destinations are respectively the specified image communication SIP-URI to the conference terminals 2 having those image communication SIP-URIs through the IP network interface unit 212, to release the image communication connections with the conference terminals 2 having those image communication SIP-URIs (which are conference terminals of users other than the forward users) (S4502).

Figure 15:
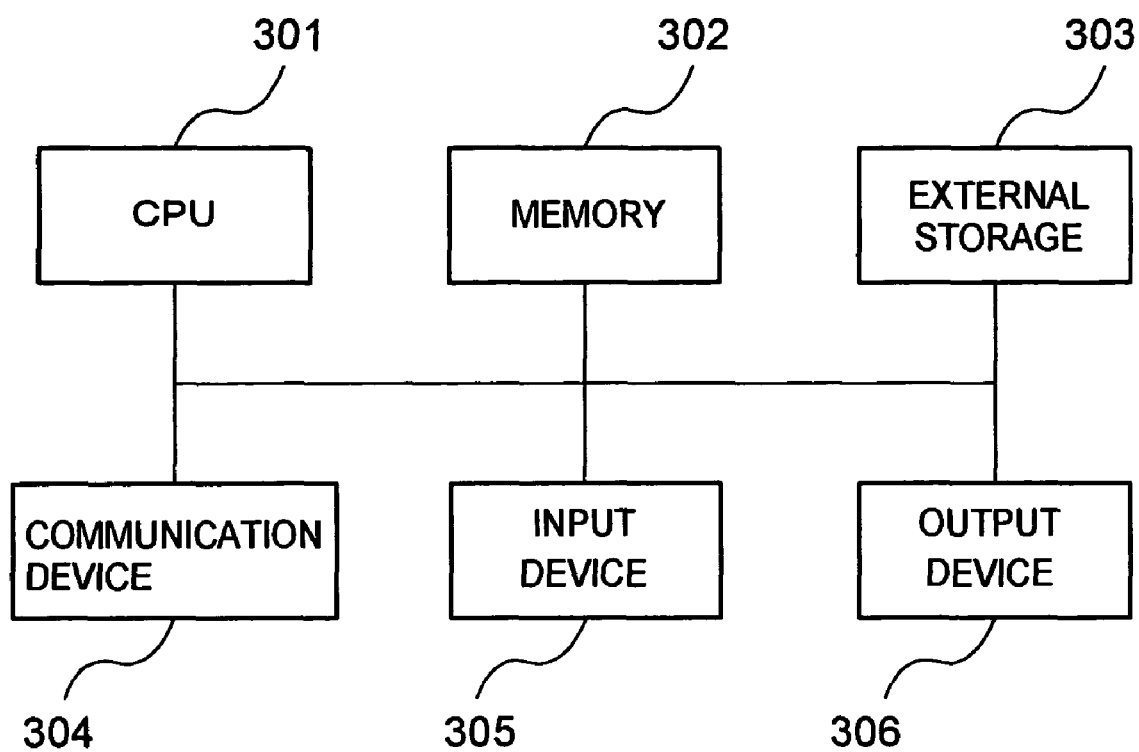
FIG. 15 is diagram showing an example of a hardware configuration of each component apparatus of the video conferencing system.

The presence server 1 having the above-described construction can be implemented by an ordinary computer system as shown in FIG. 15, comprising: a CPU 301 for executing data processing and calculation according to programs; a memory 302 that can be read and written directly by the CPU 301; an external storage 303 such as a hard disk; and a communication device for data communication with an external system through the IP network 3. For example, a server, a host computer, or the like may be used as the presence server 1.

Further, a conference terminal 2 having the above-described construction can be implemented by an ordinary computer system as shown in FIG. 15, comprising: a CPU 301 for executing data processing and calculation according to programs; a memory 302 that can be read and written directly by the CPU 301; an external storage 303 such as a hard disk; a communication device for data communication with an external system through the IP network 3; an input device 305; and an output device 306. For example, a computer system such as a PDA (Personal Digital Assistant), a PC (Personal Computer) or the like may be used as a conference terminal 2.

Each function of each apparatus described above can be realized when the CPU 301 executes a predetermined program (a presence server program in the case of the presence server 1 or a conference terminal program in the case of a conference terminal 2) loaded into or stored in the memory 302.

Next, an outline of operation of the video conferencing system of the above-described configuration will be described.

Figure 16:
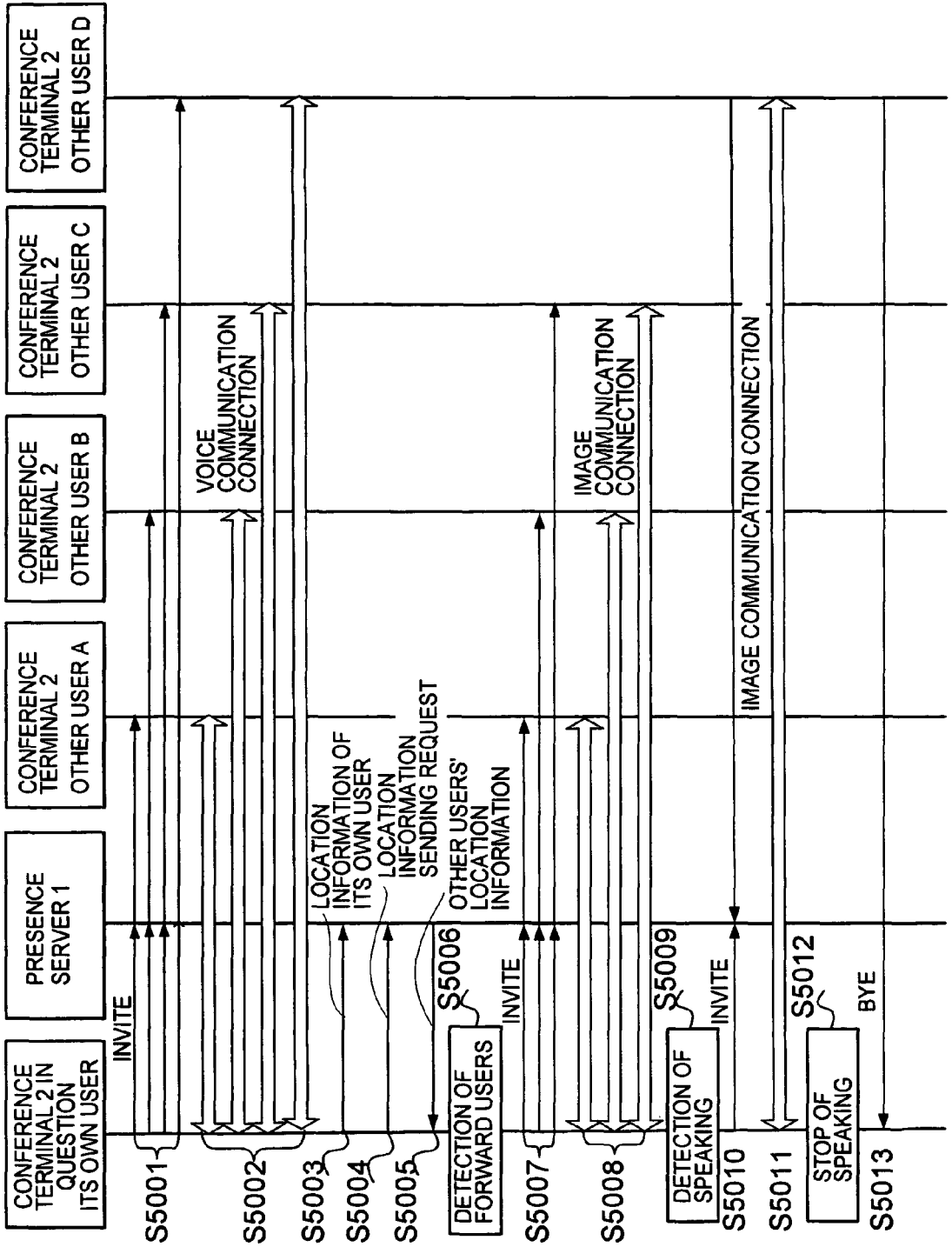
FIG. 16 is a diagram for explaining an outline of operation of the video conferencing system shown in FIG. 1.

FIG. 16 is a diagram for explaining an outline of operation of the video conferencing system shown in FIG. 1. Here, the description will be given taking an example in which conference terminals 2 of the other users A-D are already participating in a conference and a conference terminal 2 of a user in question participates the conference later.

First, the conference terminal 2 of the user in question sends INVITE messages whose destinations are voice communication SIP-URIs of the conference terminals 2 of the other users A-D to the presence server 1. The presence server 1 sends these INVITE messages to the conference terminals 2 of the other users A-D (S5001). As a result, the conference terminal 2 of the user in question establishes respective voice communication connections with the conference terminals 2 of the other users A-D (S5002).

Next, the conference terminal 2 of the user in question sends the virtual location information of its own user to the presence server 1. Receiving this, the presence server 1 manages the virtual location information of the user in question (S5003). Further, the conference terminal 2 of the user in question sends a location information sending request to the presence server 1 (S5004). Receiving this, the presence server 1 sends the virtual location information of the other users A-D to the conference terminal 2 of the user in question (S5005).

Next, the conference terminal 2 of the user in question detects forward users (S5006). Here, it is assumed that other users A-C are detected as forward users. In this case, the conference terminal 2 of the user in question sends INVITE messages whose destinations are respectively the image communication SIP-URIs of the conference terminals 2 of the forward users A-C to the presence server 1. The presence server 1 sends these INVITE messages respectively to the conference terminals 2 of the forward users A-C (S5007). As a result, the conference terminal 2 of the user in question establishes image communication connections respectively with the conference terminals 2 of the forward users A-C (S5008).

When the conference terminal 2 of the user in question detects speaking of its own user (S5009), the conference terminal 2 of the user in question sends an INVITE message whose destination is the image communication SIP-URI of the conference terminal 2 of the user D with which an image communication connection has not been established yet to the presence server 1. The presence server 1 sends this INVITE message to the conference terminal 2 of the user D (S5010). As a result, the conference terminal 2 of the user in question establishes an image communication connection with the conference terminal 2 of the user D (S5011).

Further, when the conference terminal 2 of the user in question detects stop of speaking of its own user (S5012), then the conference terminal 2 of the user in question sends a BYE message to the conference terminal 2 of the user D with which the image communication connection is established, to release the image communication connection (S5013).

Hereinabove, the first embodiment of the present invention has been described. In this embodiment, image data of each user who is located forward with respect to location and direction designated by a user of a conference terminal 2 in a virtual space is displayed on that conference terminal 2. As a result, a required bandwidth becomes smaller in comparison with a case where the conference terminal 2 displays image data of all the users. Further, when the user of the conference terminal 2 designates his location and direction in the virtual space such that a desired user is located forward from the user himself in the virtual space, it is possible to confirm a state of the desired user irrespective of existence or nonexistence of speaking of that user. Thus, according to this embodiment, it is possible to suppress the required bandwidth and to confirm a state of a key person or the like.

Second Embodiment

Figure 17:
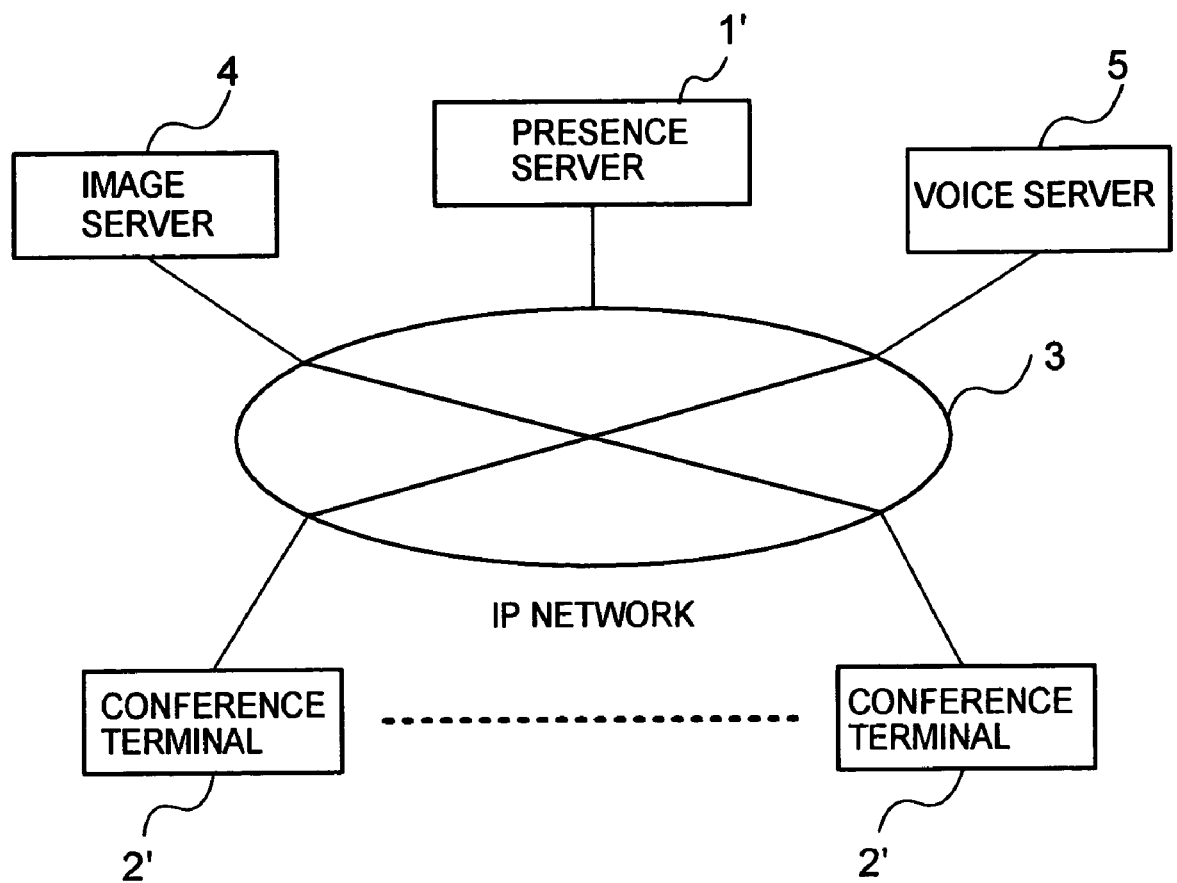
FIG. 17 is a schematic block diagram showing a video conferencing system of a second embodiment of the present invention.

FIG. 17 is a schematic block diagram showing a video conferencing system of a second embodiment of the present invention. As shown in the figure, the video conferencing system of the present embodiment comprises a presence server 1', an image server 4, a voice server 5, and a plurality of conference terminals 2, with these component apparatuses being connected with one another through an IP network 3.

The presence server 1' receives virtual location information of a user of each conference terminal 2' from that conference terminal 2' and manages the received virtual location information. Further, in response to a location information sending request from the image server 4 or the voice server 5, the presence server 1' sends the virtual location information of the user of each conference terminal 2' to the image server 4 or the voice server 5. Here, the presence server 1' of the present embodiment is different from the presence server 1 shown in FIG. 2 of the first embodiment in that the SIP server processing unit 103 is omitted. Processing flow of the presence server 1' of the present embodiment is same as the processing flow shown in FIG. 4 of the presence server 1 of the first embodiment except that the SIP processing (S1007-S1009) is omitted.

Figure 18:
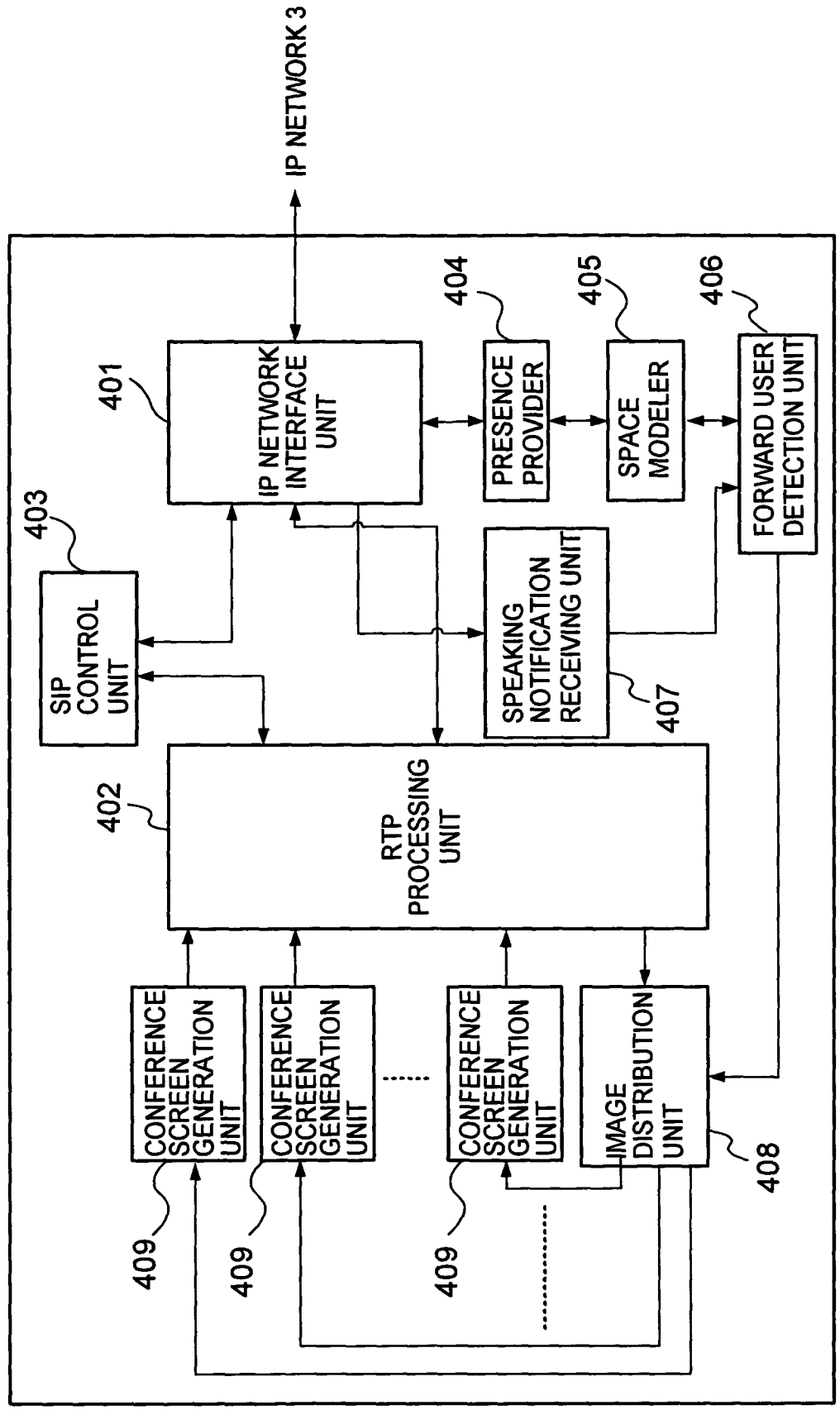
FIG. 18 is a schematic block diagram showing an image server 4.

The image server 4 receives image data of each conference terminal 2'. Further, the image server 4 generates conference screen data for a user of each conference terminal 2', and sends the generated screen data to that conference terminal 2'. FIG. 18 is a schematic block diagram of the image server 4.

As shown in the figure, the image server 4 comprises an IP network interface unit 401 for connection to the IP network 3, an RTP processing unit 402, an SIP control unit 403, a presence provider 404, a space modeler 405, a forward user detection unit 406, a speaking notification receiving unit 407, an image distribution unit 408, and conference screen generation units 409 provided respectively for the conference terminals 2'.

The SIP control unit 403 establishes an image communication connection with each conference terminal 2' through the IP interface network 401.

The RTP processing unit 402 receives image data of a user of each conference terminal 2' from that conference terminal 2' through an established image communication connection with that conference terminal 2', and outputs the received image data together with the source address of the image data to the image distribution unit 408. Further, for each conference terminal 2', the RTP processing unit 402 sends the conference screen data, which is outputted from the conference screen generation unit 409 associated with that conference terminal 2', to the conference terminal 2' in question through the established image communication connection with the conference terminal 2'.

The presence provider 404 periodically sends a location information sending request to the presence server 1 through the IP network interface unit 401, and, in response, receives a record (virtual location information) 1040 of the user of each conference terminal 2' from the presence server 1. Then, the presence provider 404 reports the received record 1040 of each user to the space modeler 405.

The space modeler 405 receives the record 1040 of the user of each conference terminal 2' from the presence provider 404, holds the received record 1040 and outputs the received record 1040 to the forward user detection unit 406.

When the speaking notification receiving unit 404 receives a speaking notification from any conference terminal 2' through the IP network interface unit 404, then the speaking notification receiving unit 404 notifies the speaking notification together with the source address of that notification to the forward user detection unit 406. Further, when the speaking notification receiving unit 404 receives a speaking stop notification, then the speaking notification receiving unit 404 notifies the speaking stop notification together with the source address of that notification to the forward user detection unit 406.

For each conference terminal 2', the forward user detection unit 406 detects, as forward users, other users located forward from the user of the conference terminal 2' in question in the virtual space, based on the virtual location information in each user's record 1040 received from the space modeler 211. Further, the forward user detection unit 406 determines a layout position of each forward user detected, in a conference screen. Then for each forward user detected, the forward user detection unit 406 generates forward user information that includes the user ID and the image communication IP address included in the record 1040 of that forward user and the layout position of that forward user in the conference screen, and sends the generated forward user information to the image distribution unit 408, associating the forward user information with the user ID of the conference terminal 2' in question. Here, a detailed method of detection of forward users and a detailed method of determination of a layout position are basically similar to ones in the forward user detection unit 216 of the first embodiment (See FIG. 6(A)).

Further, when the forward user detection unit 406 receives a speaking notification together with the source address of that speaking notification from the speaking notification receiving unit 407, then the forward user detection unit 406 examines whether, for each conference terminal, the source address coincides with the image communication IP address of any user detected as a forward user with respect to the user of the conference terminal 2' in question. When the source address does not coincide with such an image communication IP address, the forward user detection unit 406 detects the user having that source address as a speaking user for the user of the conference terminal 2' in question, and determines a layout position of the detected speaking user in the conference screen. Then, the forward user detection unit 406 generates speaking user information that includes the user ID and the image communication IP address (the source address of the speaking notification) included in the record 1040 of the detected speaking user and the layout position of the speaking user in question in the conference screen. The forward user detection unit 406 sends the generated speaking user information to the image distribution unit 408, associating the speaking user information with the user ID of the conference terminal 2' concerned. Here, the detailed method of determining the layout position of the speaking user is basically similar to the method employed by the forward user detection unit 216 of the first embodiment (See FIG. 6(B)).

Further, when the forward user detection unit 406 receives a speaking stop notification together with the source address of that speaking stop notification from the speaking notification receiving unit 407, then the forward user detection unit 406 stops generation and output of the forward user information whose image communication IP address is the source address of that speaking stop notification among pieces of forward user information outputted to the image distribution unit 408.

The image distribution unit 408 extracts image data used for a conference screen sent to each conference terminal 2' among users' image data received from the RTP processing unit 402. In detail, for each conference terminal 2', the image distribution unit 408 performs the following processing. Namely, as forward user information and speaking user information of the conference terminal 2' in question, the image distribution unit 408 extracts forward user information and speaking user information associated with the user ID of the conference terminal 2' in question among pieces of forward user information and speaking user information received from the forward user detection unit 406. Further, the image distribution unit 408 detects image data whose source address is an image communication IP address of the forward user information or the speaking user information for the conference terminal 2' in question among users' image data received from the RTP processing unit 402. Then, the image distribution unit 408 outputs the detected image data together with the forward user information or the speaking user information whose image communication IP address is the source address of the detected image data for the conference terminal 2' in question, to the conference screen generation unit 409 associated with the conference terminal 2' in question.

The conference screen generation unit 409 holds conference screen form data 2090 as shown in FIG. 7. Using the conference screen form data 2090, the conference screen generation unit 409 generates conference screen data for displaying each image data (which is received from the image distribution unit 408) such that, when the image data in question is image data of a forward user, the image data is displayed together with the user ID of that forward user in one of a plurality of sets 2093, and when the image data in question is image data of a speaking user other than the forward users, the image data is displayed together with the user ID of that speaking user in one of at least one set 2094. Then, the conference screen generation unit 409 outputs the generated conference screen data to the RTP processing unit 402.

Here, the flow of operation of each conference screen generation unit 409 is basically similar to the flow of operation of the conference screen generation unit 209 of the first embodiment except for the following points.

Namely, image data is sent from the image distribution unit 408, being associated with forward user information or speaking user information. Thus, in S2001 and S2002 of FIG. 8, the conference screen generation unit 209 extracts the forward user information whose layout position in the conference screen is the center of the screen among pieces of forward user information received from the distribution unit 408, and searches for image data associated with the extracted forward user information among the image data received from the image distribution unit 408. Further, in S2007 and S2008 of FIG. 8, the conference screen generation unit 209 extracts the forward user information whose layout position in the conference screen is n-th from the center of the screen on the side H among the pieces of forward user information received from the image distribution unit 408, and searches for image data associated with the extracted forward user information among the image data received from the image distribution unit 408. Further, in S2016 of FIG. 9, the conference screen generation unit 209 extracts speaking user information whose layout position is m-th from the center of the screen on the side J in at least one set 2094 positioned on the side of J in the conference screen form data 2090 among pieces of speaking user information received from the image distribution unit 408. Further, the conference screen generation unit 209 searches for image data associated with the extracted speaking user information among the image data received from the image distribution unit 408. Then, in S2021 of FIG. 9, the conference screen generation unit 209 outputs the generated conference screen data (See FIG. 10) to the RTP processing unit 402.

The voice server 5 receives voice data of a user of each conference terminal 2'. Further, for each conference terminal 2', the voice server 5 generates conference voice data (3 audio data) for the user of the conference terminal 2' in question, and sends the generated conference voice data to that conference terminal 2'. FIG. 19 is a schematic block diagram showing the voice server 5.

As shown in the figure, the voice server 5 comprises an IP network interface unit 501 for connection to the IP network 3, an RTP processing unit 502, an SIP control unit 503, a presence provider 504, a space modeler 505, a user information generation unit 506, a voice distribution unit 508, and audio renderers 509 respectively provided for the conference terminals 2'.

The SIP control unit 503 establishes a voice communication connection with each conference terminal 2' through the IP network interface unit 501.

The RTP processing unit 502 receives voice data of a user of each conference terminal 2' through an established voice communication connection with the conference terminal 2' in question, and outputs the received voice data together with the source address of the voice data to the voice distribution unit 508. Further, for each conference terminal 2', the RTP processing unit 502 sends conference voice data outputted from the audio renderer 509 associated with the conference terminal 2' in question to that conference terminal 2' through the established voice communication connection with respect to the conference terminal 2' in question.

The presence provider 504 periodically sends a location information sending request to the presence server 1 through the IP network interface unit 501, and, in response, receives the record (virtual location information) 1040 of the user of each conference terminal 2' from the presence server 1. Then, the presence provider 504 reports the received record 1040 of each user to the space modeler 505.

The space modeler 505 receives the record 1040 of the user of each conference terminal 2' from the presence provider 504, holds the received record 1040, and outputs the received record 1040 to the user information generation unit 506.

The user information generation unit 506 specifies, for each conference terminal 2', the record 1040 including the user ID of the conference terminal 2' in question among users' records 1040 received from the space modeler 211. Then, the user information generation unit 506 generates its-own-user information of that conference terminal 2' itself. Here, the its-own-user information includes the user ID, the voice communication IP address and the virtual location information included in the specified record 1040. Then, the user information generation unit 506 sends the generated user information to the voice distribution unit 508. Further, for each record 1040 other than the specified record 1040, the user information generation unit 506 generates other-user information that includes the user ID, the voice communication IP address and the virtual location information included in the record 1040 in question, and sends the generated other-user information to the voice distribution unit 508, associating the other-user information with user ID (which is included in the above-specified record 1040) of the user of the conference terminal 2' in question, to the voice distribution unit 508.

The voice distribution unit 508 extracts, for each conference terminal 2', voice data used for conference voice data to be sent to the conference terminal 2' in question. In detail, for each conference terminal 2', the voice distribution unit 508 performs the following processing. Namely, the voice distribution unit 508 detects its-own-user information including the user ID of the conference terminal 2' in question among pieces of its-own-user information received from the user information generation unit 506, and sends the detected its-own-user information as the its-own-user information of the conference terminal 2' in question to the audio renderer 509 associated with the conference terminal 2' in question. Further, the voice distribution unit 508 detects, as other-user information of the conference terminal 2' in question, other-user information associated with the user ID of the conference terminal 2' in question among pieces of other-user information received from the user information generation unit 506. Further, the voice distribution unit 508 detects voice data whose source address is the voice communication IP address of other-user information of the conference terminal 2' in question among users' voice data received from the RTP processing unit 502. Then, the voice distribution unit 508 outputs the detected voice data together with other-user information (of the conference terminal 2' in question) whose voice communication IP address is the source address of the detected voice data to the audio renderer 509 associated with the conference terminal 2' in question.

The audio renderer 509 receives each voice data together with the other-user information from the voice data distribution unit 508. Further, the audio renderer 509 buffers each voice data received to synchronize (associate with one another) the received voice data. Further, the audio renderer 509 makes each synchronized voice data stereophonic based on relative positions of the other users to the user concerned in the virtual space, these relative positions being specified by the virtual location information of other-user information and the virtual location information of its-own-user information given to each voice data. Then, the audio renderer 509 outputs conference voice data that includes 2-channel (i.e. left and right channels) signal data (signal sequence) to the RTP processing unit 502. Here, the method of making voice data stereophonic is basically similar to the method employed by the audio renderer 208 of the first embodiment (See FIGS. 12 and 13).

Each conference terminal 2' establishes an image communication connection with the image server 4, and sends image data of its own user to the image server 4 through the established connection. Further, the conference terminal 2' receives conference screen data from the image server 4 through the established connection, to display the received conference screen data. FIG. 20 is a schematic block diagram showing a conference terminal 2'.

As shown in the figure, each conference terminal 2' comprises a voice input unit 201, an image input unit 202, a voice output unit 203, an image output unit 204, an operation receiving unit 205, an audio encoder 206, a video encoder 207, an audio decoder 238, a video decoder 239, a presence provider 210, a space modeler 211, an IP network interface unit 212, an RTP processing unit 233, an SIP control unit 234, a speaking notification unit 235, and a seating information generation unit 217. Here, the components respectively having the same functions as ones in the conference terminal 2 of the first embodiment have the same reference symbols.

The SIP control unit 234 establishes an image communication connection with the image server 4 through the IP network interface unit 212. Further, the SIP control unit 234 establishes a voice communication connection with the voice server 5 through the IP network interface unit 212.

The RTP processing unit 233 sends image data (which is outputted from the video encoder 207) to the image server 4 through the established image communication connection with the image server 4, receives conference screen data from the image server 4 through the image communication connection, and sends the received conference screen data to the video decoder 239. Further, the RTP processing unit 233 sends voice data (which is outputted from the audio encoder 206) to the voice server 5 through the established voice communication connection with the voice server 5, receives conference voice data from the voice server 5 through the voice communication connection, and sends the received conference voice data to the audio decoder 238.

The video decoder 239 decodes the conference screen data received from the RTP processing unit 233 to output an image signal to the image output unit 204. The audio decoder 238 decodes the conference voice data received from the RTP processing unit 233 to output a voice signal to the voice output unit 204.

The speaking detection unit 235 monitors existence of speaking of a user based on a voice signal inputted to the voice input unit 201. When the speaking detection unit 235 detects speaking (i.e. a voice existing state), then the speaking detection unit 235 sends a speaking notification to the image server 4 through the IP network interface unit 212. Further, when a soundless state extending a predetermined period (for example, 10 seconds) is detected, the speaking detection unit 235 sends a speaking stop notification to the image server 4.

The presence server 1', the image server 4 and the voice server 5 having the above-described constructions can be each implemented by an ordinary computer system as shown in FIG. 15, comprising; a CPU 301 for executing data processing and calculation according to programs; a memory 303 that can be read and written directly by the CPU 301; an external storage 303 such as a hard disk; and a communication device for data communication with an external system through the IP network 3. For example, a server, a host computer, or the like may be used.

Further, a conference terminal 2' having the above-described construction can be implemented by an ordinary computer system as shown in FIG. 15, comprising: a CPU 301 for executing data processing and calculation according to programs; a memory 302 that can be read and written directly by the CPU 301; an external storage 303 such as a hard disk; a communication device for data communication with an external system through the IP network 3; an input device 305; and an output device 306. For example, a computer system such as a PDA, a PC or the like may be used as a conference terminal 2'.

Next, an outline of operation of the video conferencing system of the above-described configuration will be described.

FIG. 21 is a diagram for explaining an outline of operation of the video conferencing system shown in FIG. 17. Here, it is assumed that each of conference terminals 2' of users E-G has already established a voice communication connection and an image communication connection with each of the voice server 5 and the image server 4.

Each of the conference terminals 2' of the users E-G periodically sends virtual local information of its own user to the presence server 1' (S6001). Receiving this, the presence server 1' manages the virtual location information of each user E-G.

The voice server 5 periodically sends a location information sending request to the presence server 1' (S6002), and, in response, acquires the virtual location information of all the users E-G from the presence server 1' (S6003).

Further, the image server 4 periodically sends a location information sending request to the presence server 1' (S6004), and, in response, acquires the virtual location information of all the users E-G from the presence server 1' (S6005).

Further, each of the conference terminals 2' of the users E-G sends voice data of its own user to the voice server 5 through the established voice communication connection with the voice server 5 (S6006). For each conference terminal 2', the voice server 5 uses the voice data sent from the conference terminals 2' of the users E-G to generate conference voice data for the user E-G of the conference terminal 2' in question, and sends the generated voice data to the conference terminal 2' in question through the established voice communication connection with the conference terminal 2' in question (S6007).

Further, each of the conference terminals 2' of the users E-G sends the image data of its own user to the image server 4 through the established image communication connection with the image server 4 (S6008). For each conference terminal 2', the image server 4 uses the image data sent from the conference terminals 2' of the users E-G to generate conference screen data for the user E-G of the conference terminal 2' in question, and sends the generated conference screen data to the conference terminal 2' in question through the established image communication connection with the conference terminal 2' in question (S6009).

Further, when each of the conference terminals 2' of the users E-G detects speaking of its own user (S6010), the conference terminal 2' in question sends a speaking detection notification to the image server 4 (S6011). Receiving this, the image server 4 includes the image data of the source of the speaking detection notification into the conference screen data if necessary.

Hereinabove, the second embodiment of the present invention has been described. According to this embodiment, it is sufficient that each conference terminal 2' establishes an image communication with the image server 4 only, and thus network traffic of the IP network 3 can be reduced. Further, when a user of a conference terminal 2 designates his location and direction in the virtual space such that a desired user is located forward from himself in the virtual space, it is possible to confirm a state of the desired user irrespective of existence or nonexistence of speaking. Thus, according to this embodiment, it is possible to suppress the required bandwidth at narrower level and to confirm a state of a key person or the like of a conference easily.

The present invention is not limited to the above embodiments, and can be modified variously within the scope of the invention.

For example, each of the above embodiments has been described taking an example where SIP is used for establishing a connection. However, the present invention is not limited to this. For example, call control protocol such as H.323 other than SIP may be used. Further, when it is assumed that communications of a conference terminal 2 with the image server 4 and the voice server 5 are permanent communication as in the case of the second embodiment, it is possible to omit call control sequences in accordance with to a call control protocol.

Further, it is possible to introduce the voice server 5 of the second embodiment into the first embodiment in order to establish a voice communication connection between each conference terminal 2 and the voice server 5, omitting the conference voice data generation processing by the audio renderer 208 of the conference terminal 2. Or, it is possible to introduce the image server 4 into the first embodiment in order to establish an image communication connection between each conference terminal 2 and the image server 4, omitting the conference screen data generation processing by the conference screen generation unit 209 of the conference terminal 2.

The invention claimed is:

1. A video conferencing system comprising:
a plurality of conference terminals and a presence server for managing a location of a user of each of said plurality of conference terminals in a virtual space, wherein:
each of said plurality of conference terminals comprises:
an image data sending means, which sends image data of said each conference terminal's own user to another conference terminal in response to an image sending request from said another conference terminal;
a location determining means, which determines a location and a direction of said each conference terminal's own user in said virtual space;
a terminal side location information sending means, which sends virtual location information of said each conference terminal's own user, the virtual location information including the location and the direction determined by said location determining means to said presence server;
a terminal side location information receiving means, which receives virtual location information of each of other users who are users of conference terminals other than said conference terminal from said presence server;
a forward user detection means, which detects, as a at least one forward user, among said other users at least one user who is located in front of said each conference terminal's own user in the virtual space, based on said determined location and direction of said each conference terminal's own user and said virtual location information of each of said other users;
a communication control means which sends an image sending request to a conference terminal of each of said at least one forward user detected by said forward user detection means;
an image data receiving means, which receives image data of each of said at least one forward user from the conference terminal of each of the at least one forward user;
a display control means, which displays, on a display, a conference screen that includes image of each of said at least one forward user, the image of each of said at least one forward user being formed by the image data received by the image data receiving means;
a voice data sending means, which sends voice data of said each conference terminal's own user to said conference terminals of said other users;
a voice data receiving means, which receives voice data of said other users from the conference terminals of said other users;
a voice synthesizing means, which applies stereophonic processing on each of said other users' voice data received by said voice data receiving means, depending on a respective relative position of said at least one forward user in relation to said user in the virtual space, with said relative position being specified by the virtual location information of each of said at least one forward user and the virtual location information of said each conference terminal's own user, and synthesizes said other users' voice data submitted to the stereophonic processing, to generate stereophonic synthesized voice data;
a voice control means, which outputs the stereophonic synthesized voice data generated by said voice synthesizing means through speakers; and
a speaking detection means, which detects speaking of said each conference terminal's own user, wherein
said image data sending means of each of said plurality of conference terminals sends, as image data of a speaking user, the image data of said each conference terminal's own user to the conference terminals of said other users together with an indication of a speaking user when said speaking detection means detects speaking of said each conference terminal's own user;

said image data receiving means of each of said plurality of conference terminals receives the image data indicated as image data of a speaking user; and said display control means of each of said plurality of conference terminals displays the conference screen that further includes an image of said speaking user on the display, even when said speaking user is not said at least one forward user, and said presence server comprises:

a management means, which manages users' virtual location information sent from said plurality of conference terminals; and a server side location information sending means, which sends to each of said plurality of conference terminals the location information of each of said other users.

2. A video conferencing system according to claim 1, wherein:

the display control means of each of said plurality of conference terminals allocates, in order, the image data of said at least one forward user respectively to a plurality of display frames provided in said conference screen, according to a relative position of each of said at least one forward user in relation to said each conference terminal's own user in the virtual space, said relative position being specified by the virtual location information of each of said at least one forward user and the virtual location information of said each conference terminal's own user.

3. A video conferencing system according to claim 1, wherein:

said display control means of each of said plurality of conference terminals allocates the received image data of said speaking user to a display frame positioned on a right side or a left side of display frames to which image data of said at least one forward user is respectively allocated in said conference screen, according to a relative position of said speaking user and said each conference terminal's own user in the virtual space, said relative position being specified by the location information of said each conference terminal's own user and the location information of said speaking user, when the image data of the speaking user is image data of a user who is not said at least one forward user.

4. A video conferencing system comprising:

a plurality of conference terminals, a voice server for sending voice data to each of said plurality of conference terminals, a presence server for managing a location of a user of each of said plurality of conference terminals in a virtual space, and an image server for sending image data to each of said plurality of conference terminals, wherein:

each of said plurality of conference terminals comprises:

a terminal side image data sending means, which sends image data of said each conference terminal's own user to said image server;

a location determining means, which determines a location and a direction of said each conference terminal's own user in said virtual space;

a terminal side location information sending means, which sends virtual location information of said each conference terminal's own user, the virtual location information including the location and the direction determined by said location determining means to said presence server;

a terminal side image data receiving means, which receives conference screen data from said image server;

a display control means, which displays, on a display, the conference screen data received by said terminal side image data receiving means;

a voice data sending means, which sends voice data of said each conference terminal's own user to said voice server;

a stereophonic synthesized voice data receiving means, which receives stereophonic synthesized voice data from said voice server;

a voice control means, which outputs the stereophonic synthesized voice data received by said stereophonic synthesized voice data receiving means through speakers; and a speaking detection means, which detects speaking of said each conference terminal's own user and sends a speaking detection signal to said image server, said image server comprises:

an image server side image data receiving means, which receives image data of said user of each of said plurality of conference terminals;

an image server side location information receiving means, which receives virtual location information of each of said plurality of conference terminals from said presence server;

a forward user detection means, which detects, as a at least one forward user, at least one other user who is located in front of said each conference terminal's own user in the virtual space, based on the determined location and direction of said each conference terminal's own user and the virtual location information of each of said at least one other user, said at least one other user being a user of a conference terminal other than said each conference terminal; and an image server side image data sending means, which sends to each of said plurality of conference terminals conference screen data including the image data of each of the at least one forward user detected in relation to said each conference terminal by said forward user detection means, out of image data received by said image server side image data receiving means of respective users of said plurality of conference terminals;

said presence server comprises:

a presence server side location information receiving means, which receives said each conference terminal's own user's virtual location information sent from said each of said plurality of conference terminals;

a management means, which manages users' virtual location information sent from said plurality of conference terminals; and a presence server side location information sending means, which sends the virtual location information of each of said plurality of conference terminals to said image server, said virtual location information being managed by said management means, and said voice server comprises:

a voice data receiving means, which receives voice data of said each conference terminal's own user;

a voice server side location information receiving means, which receives virtual location information of said each conference terminal's own user from said presence server;

a voice synthesizing means, which applies, for each of said plurality of conference terminals, stereophonic processing on each of voice data of said other users among voice data received by said voice data receiving means, depending on respective relative positions of said at least one forward user in relation to said each conference terminal's own user in the virtual space, said relative positions being specified by the virtual location information of each of said at least one forward users user and the virtual location information of said each conference terminal's own user, and synthesizes said other users' voice data submitted to the stereophonic processing, to generate stereophonic synthesized voice data; and a stereophonic synthesized voice data sending means, which sends the stereophonic synthesized voice data generated by said voice synthesizing means with respect to each of said plurality of conference terminals to said each conference terminal, and wherein said image server further comprises a speaking detection signal receiving means, which receives the speaking detection signal from each of said plurality of conference terminals, and wherein when said speaking detection signal receiving means receives a speaking detection signal, said image server side image data sending means of said image server sends image data of a user as a source of said speaking signal to each of said plurality of conference terminals if said user as a source of said speaking signal is other than the at least one forward user detected by said forward user detection means, said image data being included as image data of a speaking user in the conference screen data.

5. A video conferencing system according to claim 4, wherein:

said image server side image data sending means of said image server determines, for each of said plurality of conference terminals, a layout position of image data of each of said at least one forward user in said conference screen, according to a relative position of said at least one forward user detected by said forward user detection means in relation to said each conference terminal's user in the virtual space, and sends, to said each conference terminal, the conference screen data in which the image data of the at least one forward user are respectively allocated, in order, to a plurality of display frames provided in said conference screen.

6. A video conferencing system according to claim 4, wherein:

for each of said plurality of conference terminals, said image server side image data sending means of said image server determines a layout position of the image data sent to the conference terminal of the speaking user in the conference screen, depending on a relative position of said speaking user in relation to said each conference terminal's user in the virtual space, and sends the conference screen data to said each conference terminal, the image data of said speaking user being allocated based on said determined layout position to a display frame positioned in said conference screen on a right side or left side of display frames to which image data of said at least one forward user are respectively allocated in said conference screen data.

7. A conference terminal, comprising:

an image data sending means, which sends image data of said conference terminal's own user to another conference terminal in response to an image sending request from said another conference terminal;

a location determining means, which determines a location and a direction of said conference terminal's own user in said virtual space;

a terminal side location information sending means, which sends virtual location information of said conference terminal's own user, the virtual information including the location and the direction determined by said location determining means to a presence server that manages a location, in said virtual space, of a user of each of a plurality of conference terminals participating in a video conference;

a terminal side location information receiving means, which receives virtual location information of each of other users of conference terminals other than said conference terminal from said presence server;

a forward user detection means, which detects, as at least one forward user, at least one of said other users located in front of said conference terminal's own user in the virtual space, based on said determined location and direction of said conference terminal's own user and said virtual location information of each of said other users;

a communication control means which sends an image sending request to a conference terminal of each of said at least one forward user detected by said forward user detection means;

an image data receiving means, which receives image data of each of said at least one forward user from the conference terminal of each of the at least one forward user;

a display control means, which displays, on a display, a conference screen that includes image of each of said at least one forward user, the image of each of said at least one forward user being formed by the image data received by the image data receiving means;

a voice data sending means, which sends voice data of said each conference terminal's own user to said conference terminals of said other users;

a voice data receiving means, which receives voice data of said other users from the conference terminals of said other users;

a voice synthesizing means, which applies stereophonic processing on each of said other users' voice data received by said voice data receiving means, depending on a respective relative position of said at least one forward user in relation to said user in the virtual space, with said relative position being specified by the virtual location information of each of said at least one forward user and the virtual location information of said each conference terminal's own user, and synthesizes said other users' voice data submitted to the stereophonic processing, to generate stereophonic synthesized voice data;

a voice control means, which outputs the stereophonic synthesized voice data generated by said voice synthesizing means through speakers; and a speaking detection means, which detects speaking of said each conference terminal's own user, wherein said image data sending means of each of said plurality of conference terminals sends, as image data of a speaking user, the image data of said each conference terminal's own user to the conference terminals of said other users together with an indication of a speaking user when said speaking detection means detects speaking of said each conference terminal's own user;

said image data receiving means of each of said plurality of conference terminals receives the image data indicated as image data of a speaking user; and said display control means of each of said plurality of conference terminals displays the conference screen that further includes an image of said speaking user on the display, even when said speaking user is not said at least one forward user.

8. A computer-readable program embodied on a non-transitory medium which makes a computer function as a conference terminal, said conference terminal comprising:

an image data sending means, which sends image data of said conference terminal's own user to another conference terminal in response to an image sending request from said another conference terminal;

a location determining means, which determines a location and a direction of said conference terminal's own user in said virtual space;

a terminal side location information sending means, which sends virtual location information of said conference terminal's own user, the virtual location information including the location and the direction determined by said location determining means to a presence server that manages a location, in said virtual space, of a user of each of a plurality of conference terminals;

a terminal side location information receiving means, which receives virtual location information of each of other users who are users of conference terminals other than said conference terminal, from said presence server;

a forward user detection means, which detects, as a at least one forward user, at least one of said other users located in front of said conference terminal's own user in the virtual space, based on said information determined location and direction of said conference terminal's own user and said virtual location information of each of said other users;

a communication control means which sends an image sending request to a conference terminal of each of said at least one forward user detected by said forward user detection means;

an image data receiving means, which receives image data of each of said at least one forward user from the conference terminal of each of the at least one forward user;

a display control means, which displays, on a display, a conference screen that includes an image of each of said at least one forward user, the image of each of said at least one forward user being formed by the image data received by the image data receiving means;

a voice data sending means, which sends voice data of said each conference terminal's own user to said conference terminals of said other users;

a voice data receiving means, which receives voice data of said other users from the conference terminals of said other users;

a voice synthesizing means, which applies stereophonic processing on each of said other users' voice data received by said voice data receiving means, depending on a respective relative position of said at least one forward user in relation to said user in the virtual space, with said relative position being specified by the virtual location information of each of said at least one forward user and the virtual location information of said each conference terminal's own user, and synthesizes said other users' voice data submitted to the stereophonic processing, to generate stereophonic synthesized voice data;

a voice control means, which outputs the stereophonic synthesized voice data generated by said voice synthesizing means through speakers; and a speaking detection means, which detects speaking of said each conference terminal's own user, wherein said image data sending means of each of said plurality of conference terminals sends, as image data of a speaking user, the image data of said each conference terminal's own user to the conference terminals of said other users together with an indication of a speaking user when said speaking detection means detects speaking of said each conference terminal's own user;

said image data receiving means of each of said plurality of conference terminals receives the image data indicated as image data of a speaking user; and said display control means of each of said plurality of conference terminals displays the conference screen that further includes an image of said speaking user on the display, even when said speaking user is not said at least one forward user.

* * * * *